(12) United States Patent
Seehorn

(10) Patent No.: US 8,456,027 B1
(45) Date of Patent: Jun. 4, 2013

(54) HYDRO-MECHANICAL POWER GENERATOR SYSTEM AND METHOD

(76) Inventor: Joseph Wesley Seehorn, Dallas, TX (US)

( * ) Notice: Subject to any disclaimer, the term of this patent is extended or adjusted under 35 U.S.C. 154(b) by 339 days.

(21) Appl. No.: 12/938,525

(22) Filed: Nov. 3, 2010

Related U.S. Application Data

(60) Provisional application No. 61/380,778, filed on Sep. 8, 2010.

(51) Int. Cl.
*F02B 63/04* (2006.01)
*F03G 7/08* (2006.01)
*H02K 7/18* (2006.01)
*F03B 17/02* (2006.01)

(52) U.S. Cl.
USPC ............................ 290/1 R; 60/495; 60/496

(58) Field of Classification Search
USPC ................................ 290/1 R; 60/495, 496
See application file for complete search history.

(56) References Cited

U.S. PATENT DOCUMENTS

| | | | | |
|---|---|---|---|---|
| 272,656 | A * | 2/1883 | Cook | 60/496 |
| 366,551 | A * | 7/1887 | Baker | 60/496 |
| 3,715,885 | A * | 2/1973 | Schur | 60/496 |
| 3,857,242 | A * | 12/1974 | Gilmore | 60/495 |
| 3,907,454 | A * | 9/1975 | Punton | 415/5 |
| 3,934,964 | A * | 1/1976 | Diamond | 415/7 |
| 4,038,826 | A * | 8/1977 | Shaw | 60/641.14 |
| 4,054,031 | A * | 10/1977 | Johnson | 60/496 |
| 4,095,426 | A * | 6/1978 | Rhodes | 60/496 |
| 4,103,493 | A * | 8/1978 | Schoenfelder | 60/641.11 |
| 4,111,259 | A * | 9/1978 | Lebduska | 237/1 R |
| 4,196,590 | A * | 4/1980 | Fries | 60/496 |
| 4,265,599 | A * | 5/1981 | Morton | 417/54 |
| 4,326,132 | A * | 4/1982 | Bokel | 290/1 R |
| 4,342,196 | A * | 8/1982 | Yeh | 60/531 |
| 4,363,212 | A * | 12/1982 | Everett | 60/496 |
| 4,462,213 | A * | 7/1984 | Lewis | 60/641.8 |
| 4,498,294 | A * | 2/1985 | Everett | 60/496 |
| 4,538,415 | A * | 9/1985 | Lebecque | 60/639 |

(Continued)

FOREIGN PATENT DOCUMENTS

| | | |
|---|---|---|
| WO | WO01/29961 A1 | 4/2001 |
| WO | WO02/33251 A1 | 4/2002 |

(Continued)

OTHER PUBLICATIONS

Message board discussion from http://www.physicsforums.com/archive/index.php/t-148606.html, listed dates Dec. 18-19, 2006, pp. 1-4.

*Primary Examiner* — Pedro J Cuevas
(74) *Attorney, Agent, or Firm* — Glady K. Bergen

(57) ABSTRACT

A hydro-mechanical system and method for generating power employs an upright elongated fluid vessel containing a fluid. A rotatable drive having a drive shaft is mounted to the fluid vessel for providing a power output through the drive shaft. A pair of buoyancy vehicles are located within a vehicle section of the vessel and are each coupled by a flexible coupling to the rotatable drive. A pressurized gas chamber that is coupled to a pressurized gas source is used to charge the buoyancy vehicles through a pair of charging valves to move the buoyancy vehicles within the vehicle section thus driving the flexible coupling and rotatable drive. A pair of gas of release valves are also provided for discharging gas from the vehicle when buoyancy vehicle is vehicle is located at the uppermost position.

19 Claims, 17 Drawing Sheets

U.S. PATENT DOCUMENTS

| | | | | |
|---|---|---|---|---|
| 4,715,182 | A * | 12/1987 | Adams | 60/495 |
| 4,718,232 | A * | 1/1988 | Willmouth | 60/495 |
| 4,726,188 | A * | 2/1988 | Woolfolk | 60/496 |
| 4,739,620 | A * | 4/1988 | Pierce | 60/641.8 |
| 4,981,015 | A * | 1/1991 | Simpson | 60/496 |
| 5,555,728 | A * | 9/1996 | Welch, Jr. | 60/496 |
| 5,685,147 | A * | 11/1997 | Brassea | 60/496 |
| 5,944,480 | A * | 8/1999 | Forrest | 415/5 |
| 6,051,891 | A * | 4/2000 | Surodin | 290/2 |
| 6,249,057 | B1 * | 6/2001 | Lehet | 290/1 R |
| 6,305,165 | B1 * | 10/2001 | Mizuki, Sr. | 60/496 |
| 6,406,222 | B1 * | 6/2002 | Pollack | 405/224 |
| 6,447,243 | B1 * | 9/2002 | Kittle | 415/92 |
| 6,990,809 | B2 * | 1/2006 | Abouraphael | 60/496 |
| 7,134,283 | B2 | 11/2006 | Villalobos | |
| 7,243,803 | B2 * | 7/2007 | Tashiro et al. | 210/526 |
| 7,413,384 | B2 * | 8/2008 | Horton et al. | 405/224.2 |
| 7,434,396 | B2 * | 10/2008 | McGahee | 60/495 |
| 7,553,106 | B2 * | 6/2009 | Horton et al. | 405/195.1 |
| 7,628,528 | B2 * | 12/2009 | Zeikus | 366/102 |
| 7,656,051 | B2 | 2/2010 | Perin | |
| 7,819,576 | B2 * | 10/2010 | Zeikus | 366/102 |
| 7,877,995 | B2 * | 2/2011 | Sandler | 60/496 |
| 7,892,424 | B2 * | 2/2011 | Mayrand | 210/151 |
| 8,024,927 | B1 * | 9/2011 | Azizi et al. | 60/496 |
| 8,151,565 | B2 * | 4/2012 | Carrion-Torres et al. | 60/465 |
| 8,171,729 | B2 * | 5/2012 | O'Briant | 60/495 |
| 2003/0145589 | A1 * | 8/2003 | Tillyer | 60/496 |
| 2003/0151258 | A1 | 8/2003 | Shin | |
| 2005/0188691 | A1 * | 9/2005 | Uhl et al. | 60/495 |
| 2005/0247055 | A1 * | 11/2005 | Abouraphael | 60/495 |
| 2006/0042244 | A1 * | 3/2006 | Villalobos | 60/495 |
| 2006/0096914 | A1 * | 5/2006 | Tashiro et al. | 210/526 |
| 2006/0218917 | A1 * | 10/2006 | Abou-Raphael | 60/495 |
| 2007/0080540 | A1 | 4/2007 | Tung | |
| 2008/0044235 | A1 * | 2/2008 | Horton et al. | 405/224.2 |
| 2008/0056829 | A1 * | 3/2008 | Horton et al. | 405/224 |
| 2008/0264056 | A1 * | 10/2008 | Tung | 60/496 |
| 2009/0021016 | A1 | 1/2009 | McDermott | |
| 2009/0127866 | A1 * | 5/2009 | Cook | 290/1 R |
| 2009/0293472 | A1 | 12/2009 | Propp | |
| 2010/0024413 | A1 * | 2/2010 | Kim | 60/496 |
| 2010/0031651 | A1 * | 2/2010 | Spataro | 60/495 |
| 2010/0095666 | A1 * | 4/2010 | Brumfield | 60/495 |
| 2010/0180587 | A1 * | 7/2010 | Manakkattupadeettathil | 60/495 |
| 2010/0223922 | A1 * | 9/2010 | McGahee | 60/495 |
| 2011/0083430 | A1 * | 4/2011 | Kim | 60/496 |
| 2011/0162356 | A1 * | 7/2011 | Hastings | 60/495 |
| 2011/0179784 | A1 * | 7/2011 | Hastings | 60/495 |
| 2012/0060489 | A1 * | 3/2012 | Rizzi | 60/496 |
| 2012/0060490 | A1 * | 3/2012 | Abdalla | 60/496 |
| 2012/0090312 | A1 * | 4/2012 | Wilson et al. | 60/495 |
| 2012/0312008 | A1 * | 12/2012 | Campos Alvarez | 60/495 |

FOREIGN PATENT DOCUMENTS

| | | |
|---|---|---|
| WO | WO2005/091706 A2 | 10/2005 |
| WO | WO2007/140583 A1 | 12/2007 |
| WO | WO2008/039884 A2 | 4/2008 |
| WO | WO2008/098003 A1 | 8/2008 |
| WO | WO2008/099045 A1 | 8/2008 |
| WO | WO2008/129515 A2 | 10/2008 |
| WO | WO2009/044377 A2 | 4/2009 |

* cited by examiner

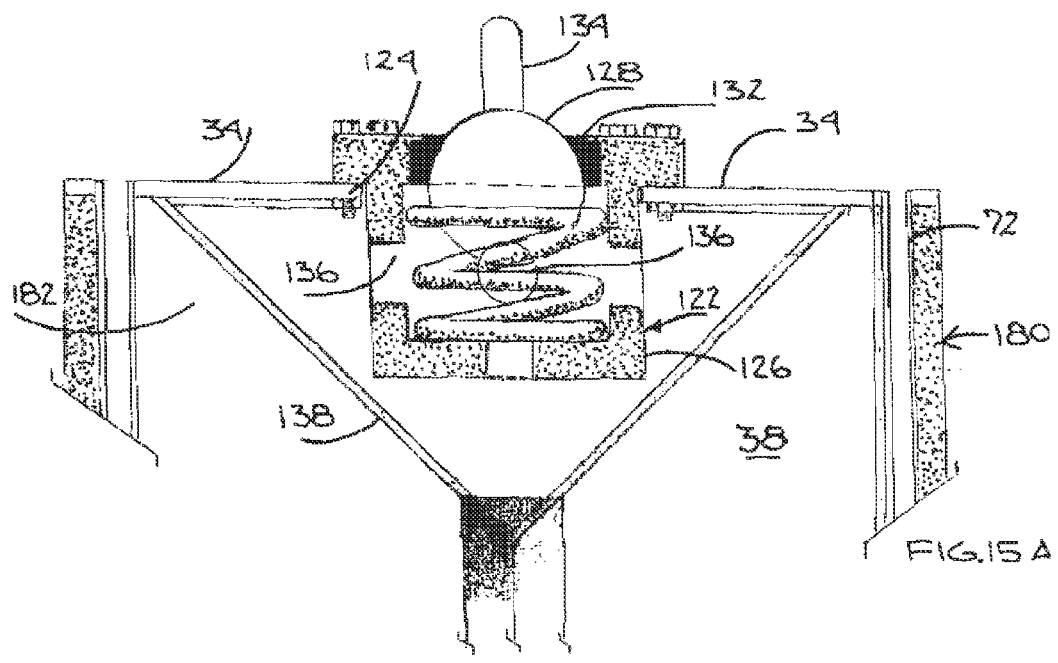
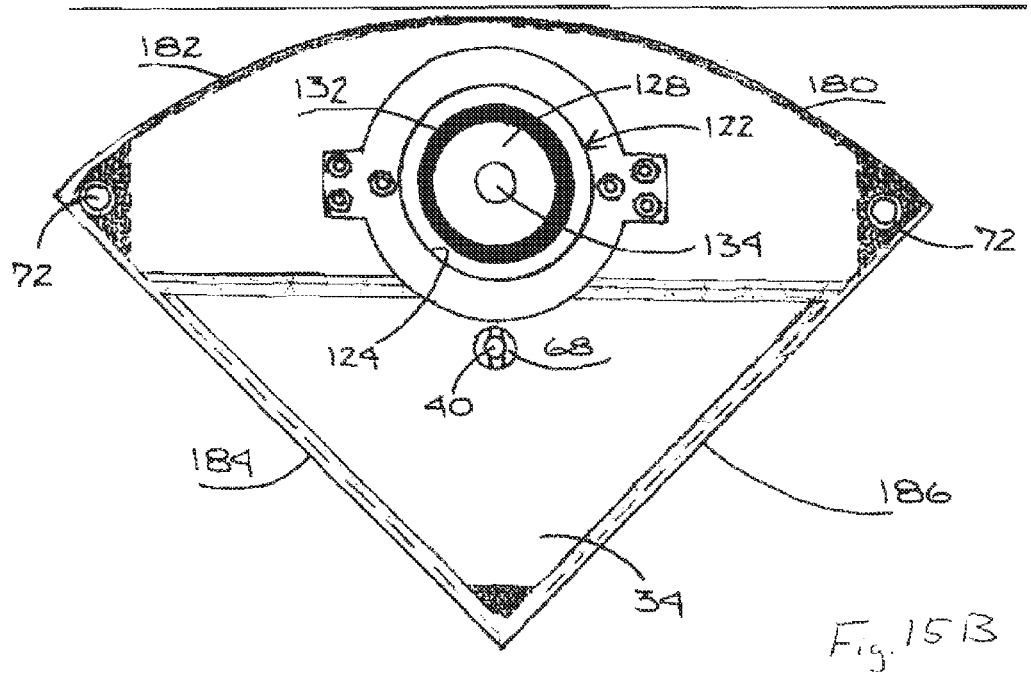

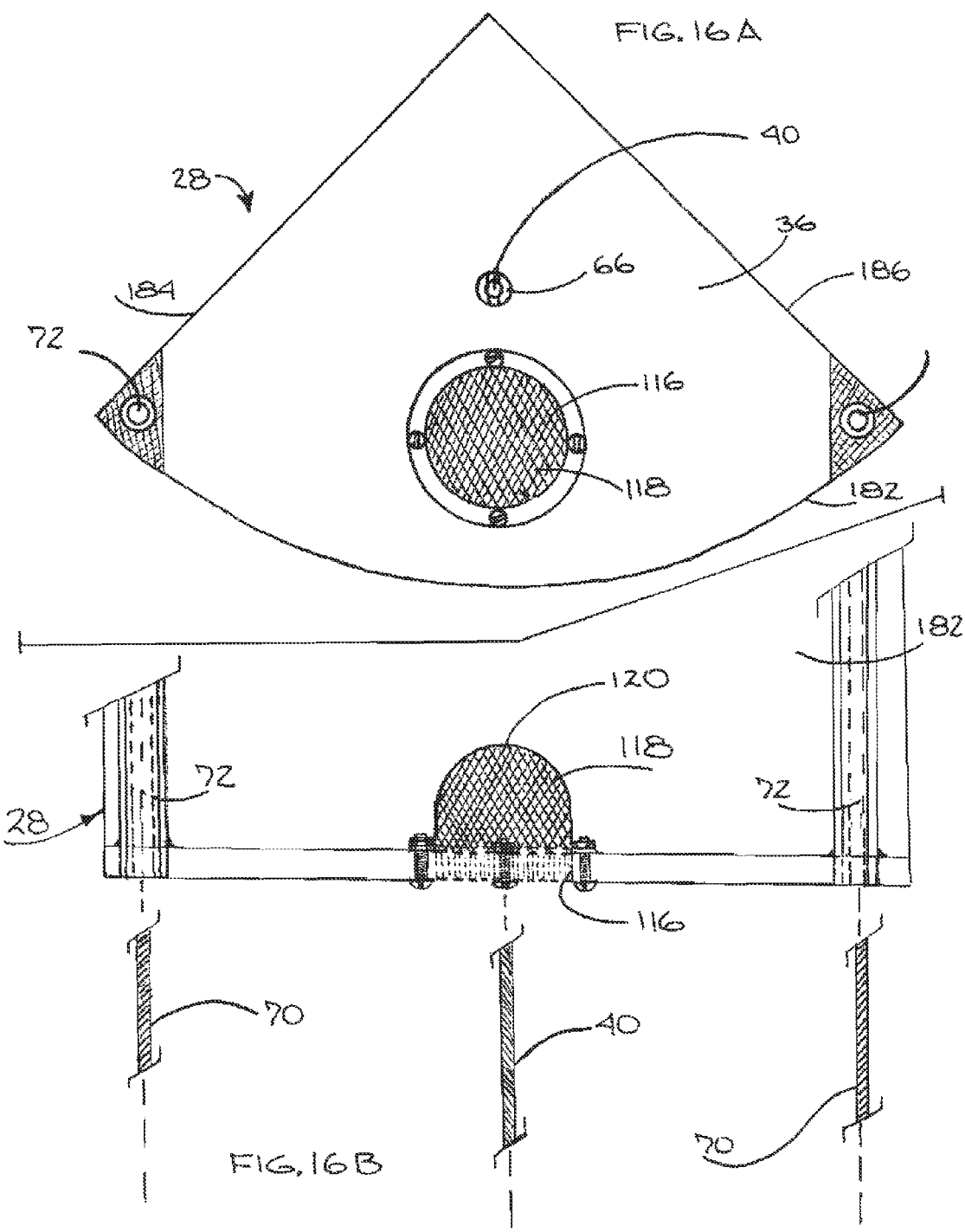

HYDRO-MECHANICAL POWER GENERATOR SYSTEM AND METHOD

CROSS-REFERENCE TO RELATED APPLICATIONS

This application claims the benefit of U.S. Provisional Application No. 61,380,778, filed Sep. 8, 2010, which is incorporated herein by reference in its entirety.

BRIEF DESCRIPTION OF THE DRAWINGS

For a more complete understanding of the present invention, and the advantages thereof, reference is now made to the following descriptions taken in conjunction with the accompanying figures, in which:

FIG. 15A is a cross-sectional elevational view of an upper portion of the buoyancy vehicle of FIG. 14;

FIG. 15B is a top plan view of the buoyancy vehicle of FIG. 15A;

FIG. 16A is a bottom plan view of the buoyancy vehicle of FIG. 15A;

FIG. 16B is a cross-sectional elevational view of a lower portion of the buoyancy vehicle of FIG. 15A.

DETAILED DESCRIPTION

Figure 1:
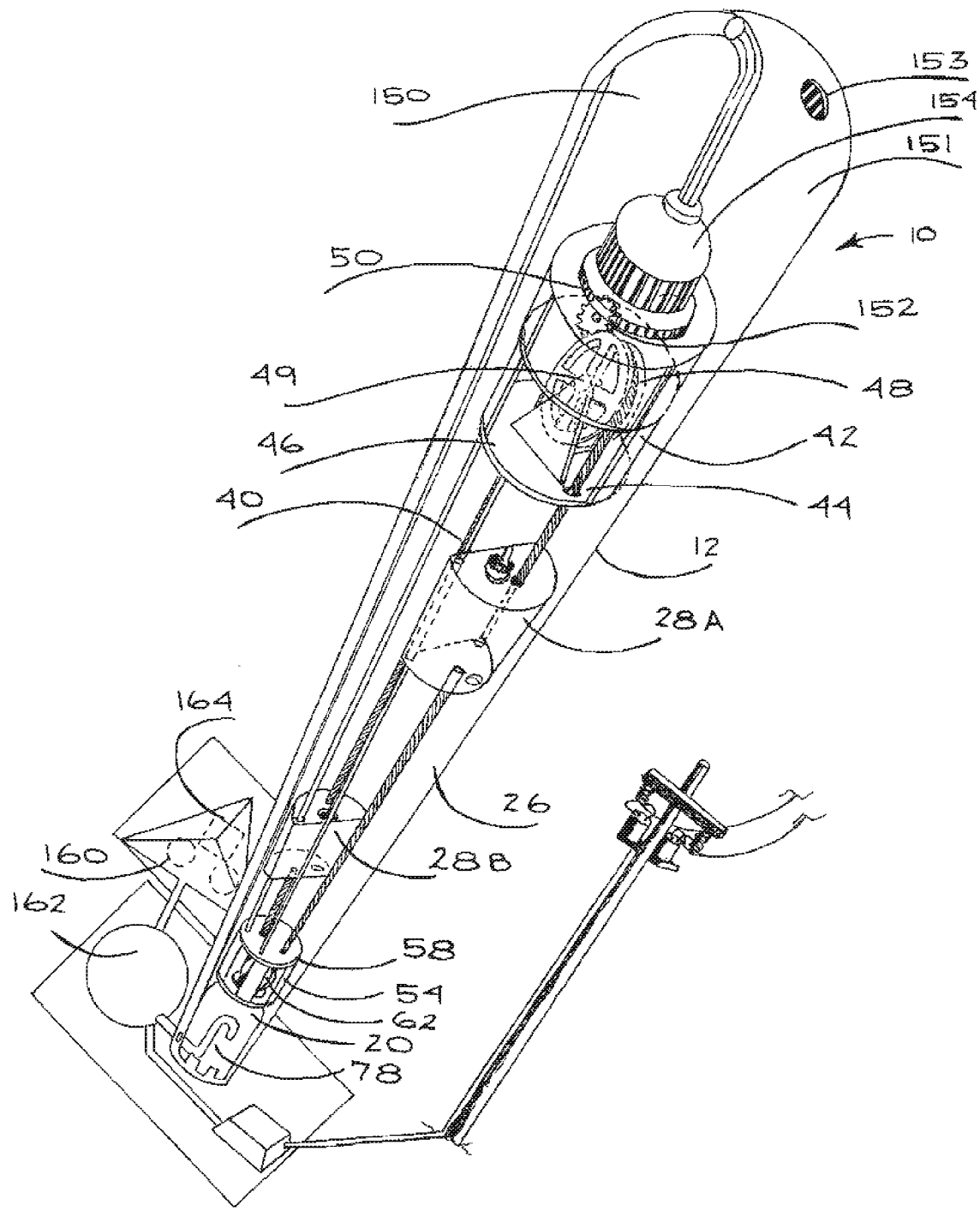
FIG. 1 is a perspective view of a hydro-mechanical power generating system constructed in accordance with the invention.
Figure 2:
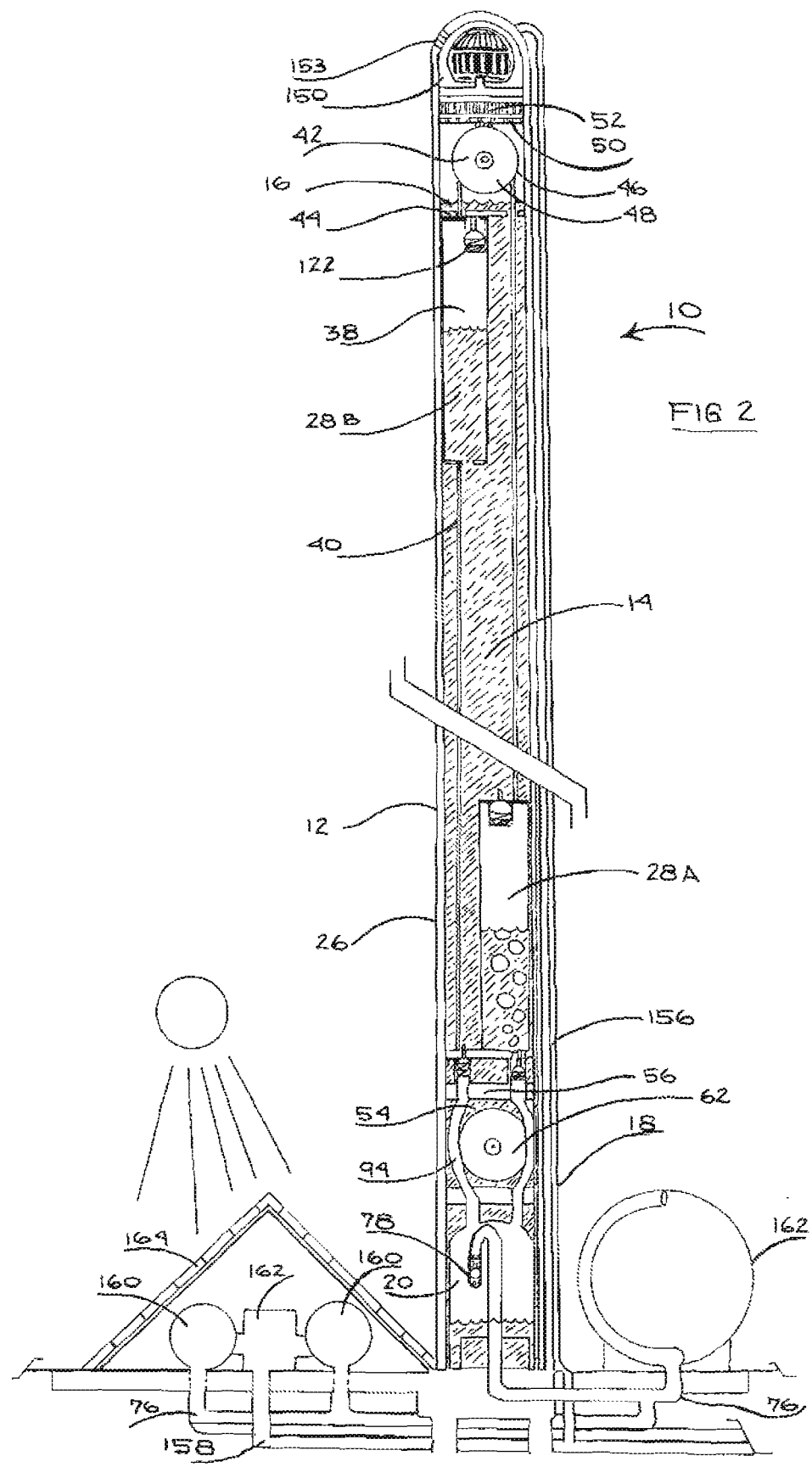
FIG. 2 is cross-sectional elevational view of the hydro-mechanical power generating system of FIG. 1.

Referring to FIGS. 1 and 2, a hydro-mechanical power system 10 is shown. The system 10 includes a fluid vessel 12, which is shown as being an upright, elongated fluid vessel. The vessel 12 may have a generally cylindrical shape with a hollow interior or reservoir 14 having a generally circular transverse cross section along its length for containing a column of fluid 16, as well as housing other components of the system 10, as will be described later on. Although the vessel 12 is shown as being configured as a cylinder, other configurations may be used as well provided the vessel 12 is capable of holding an amount and height of fluid to facilitate the generation of power, as is described herein. In certain embodiments, the cylindrical vessel 12 may have a height of from about 50 feet to 200 feet, with a height to diameter ratio of from about 5:1 to about 20:1, although this may vary. A particularly well suited configuration for the vessel 12 in one embodiment is that having a height of about 100 feet with a diameter of about 10 feet. The size of the vessel 12 may be dictated by the particular power requirements demanded by the system 10. In certain applications, one or more systems 10 employing one or more vessels 12 may be used to generate the necessary power output. The vessel 12 may be formed from any suitable material or combination of materials, such as metal (e.g. steel, coated steel, stainless steel, etc.), composite materials (e.g. fiberglass, carbon fiber, etc.), polymeric materials (e.g. polypropylene, polycarbonate), concrete, masonry, etc., or combination of materials, which are capable of containing the column of fluid 16 and housing the various components of the system 10. Other components of the system 10 may be formed from such materials as well.

It should be noted in the description, if a numerical value or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific points within the range, or even no point within the range, are explicitly identified or refer to, it is to be understood that the inventor appreciates and understands that any and all points within the range are to be considered to have been specified, and that inventor possesses the entire range and all points within the range.

The vessel 12 and other components of the system 10 may be located above ground in certain embodiments. Various support structures and/or frameworks (not shown) may also be employed with the vessel 12 and system 10 to facilitate supporting of the vessel 12 in the upright position, as well as supporting components of the system 10 and providing access to the system 10, such as a foundations, framing, ladders, staircases, platforms, walkways, etc. (not shown), for support, maintenance, etc. In other embodiments, the vessel 12 or portions thereof, as well as other components of the system may be located below ground.

The fluid 16 may be any fluid that provides the buoyant forces necessary for the operation of the system 10, as is described herein. The fluid is typically a liquid, which may be aqueous or non-aqueous, although the system 10 may also function with a gas as the fluid 16, such as a dense gas that provides the necessary buoyant forces. In most applications, the fluid 16 is water, which may include fresh water, sea water, salt water, brine, etc. In certain applications, salts and other additives may be added to the water to increase the density of the fluid 16. The components of the system 10 in contact with the fluid 16 may be constructed of materials that are resistant to corrosion or other degradation in the fluid 16.

Figure 3:
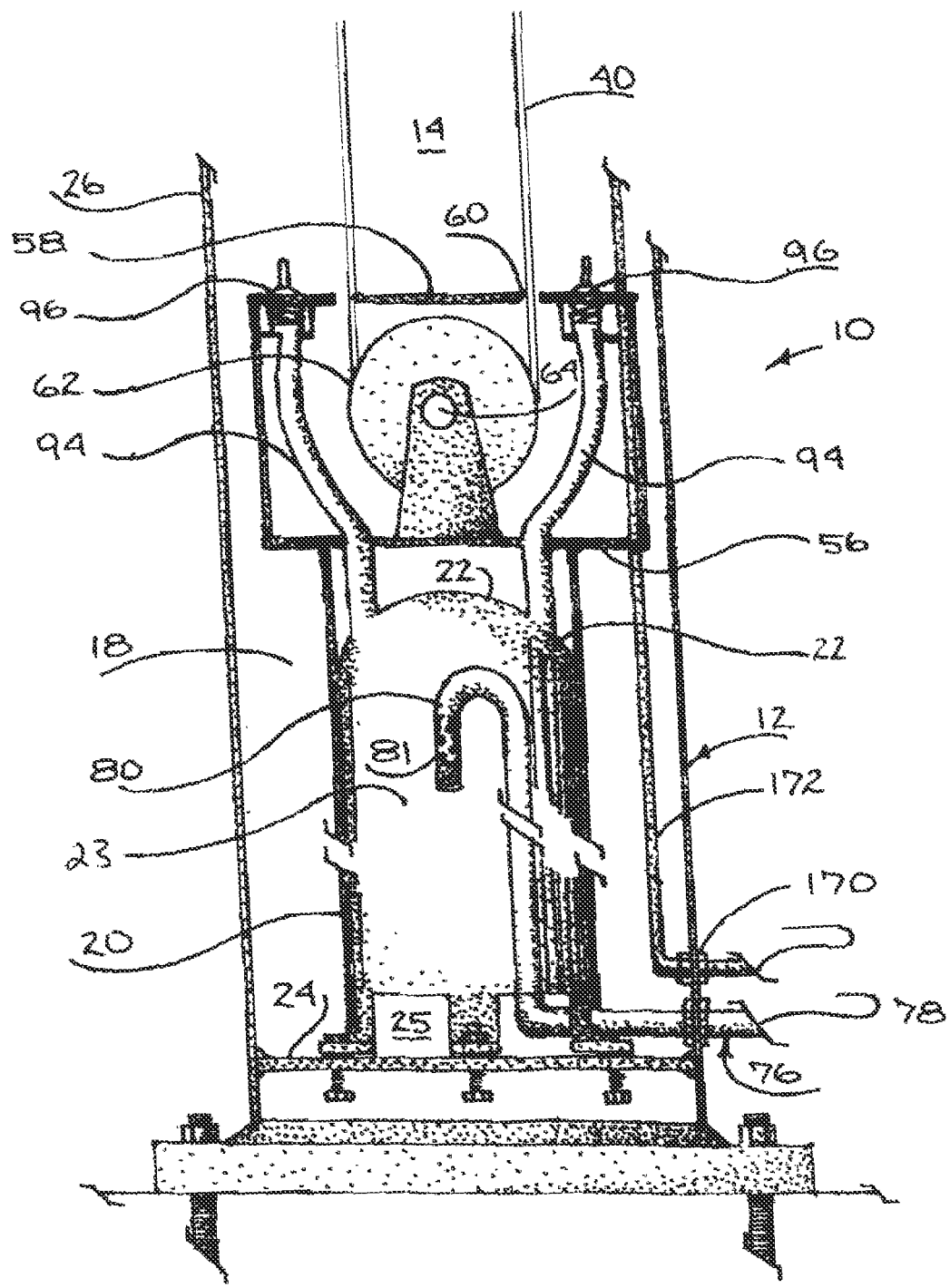
FIG. 3 is an enlarged cross-sectional elevational view of a lower portion of a fluid vessel of the hydro-mechanical power generating system of FIG. 1.

As shown in FIG. 2, the lowermost portion or section 18 of the fluid vessel 12 houses a pressurized gas chamber 20. Referring to FIG. 3, the gas chamber 20 is configured as a bell having a dome-shaped, hemi-spherical, or concave upper end 22 and a lower cylindrical body or lower portion 23 that is secured at its base to a floor 24 of the vessel 12. The lowermost end of the chamber 20 is open or provided with a series of openings 25 so that it is in fluid communication with the exterior of the chamber 20 to allow the ingress and egress of fluid 16 between the interior of the chamber 20 and the exterior of the chamber 20 within the fluid vessel 12.

The fluid vessel 12 also includes a vehicle section 26 (FIG. 2), which is located at a position of the fluid vessel 12 above the section 18. The vehicle section 26 constitutes a major portion of the fluid vessel and may compose from 60 to 90 percent or more of the length of the fluid vessel 12. The column of fluid 16 within the vessel 12 may terminate at a position at or just below the upper end of the vehicle section 26.

Disposed within the vehicle section 26 are a pair of buoyancy vehicles designated generally with the numeral 28, and which are individually designated 28A and 28B. The buoyancy vehicles 28 may have a variety of configurations provided they operate and function in a manner as will be described herein. In the embodiment shown in FIGS. 4 and 5, each of the buoyancy vehicles 28 is configured as a half cylinder with a generally flat upright inner wall 30 from which extends an upright half-cylinder-shaped outer wall 32, wherein each vehicle 28 has a generally semi-circular transverse cross section, as shown in FIG. 5. Upper wall 34 (FIG. 4) and lower wall 36 (FIG. 5) are joined to the walls 30, 32 and close off the ends of the vehicle 28 to define an interior reservoir 38 (FIG. 6). The upper and lower walls 34, 36 are shown as being generally flat members or plates, although other configurations for the end walls 34, 36 may be used as well.

The buoyancy vehicles 28A, 28B are each disposed within the vehicle section 26 of the fluid vessel 12 so that the walls 30 face inwards towards a central longitudinal axis of the vehicle section 26. The buoyancy vehicles 28 are closely received within the vehicle section 26 of the fluid vessel 12, with a clearance provided between the walls 30 of the vehicles 28A, 28B when the vehicles 28A, 28B pass one another within the vehicle section 26 of the fluid vessel 12. Similarly, a clearance is also provided around the outer facing half-cylinder walls 32 and the interior of the vehicle section 26 of the fluid vessel 12 to avoid contact with the inner walls of the fluid vessel 12. The clearances provided may be enough to facilitate free movement of the buoyancy vehicles 28 within the vehicle section 26 to minimize the necessary diameter of the fluid vessel 12. The volume of the interior 38 of each of the buoyancy vehicles 28 may vary depending upon the height of the column of fluid within the vehicle section 26 taking into account the degree of expansion of the air or gas as it rises through the column of fluid and the initial amount of air or pressurized gas that is required to provide the necessary lifting of the vehicles 28 and operation of the system 10, as is described in more detail later on.

The buoyancy vehicles 28 are each coupled to an elongated flexible coupling or couplings 40. The flexible coupling 40 may be in the form of one or more lengths of flexible material, such as a cable, belt, chain, rope, line, etc., that is driven by movement of the buoyancy vehicles 28 within the vehicle section 26. The flexible coupling 40 passes from the vehicle section 26 into a drive section 42 of the system 10 located at a position above the vehicle section 12. In the embodiment shown, the drive section 42 is provided in an upper portion of the fluid vessel 12. A platform or deck 44 is provided within the fluid vessel 12 for supporting components of the drive system 46.

Figure 7:
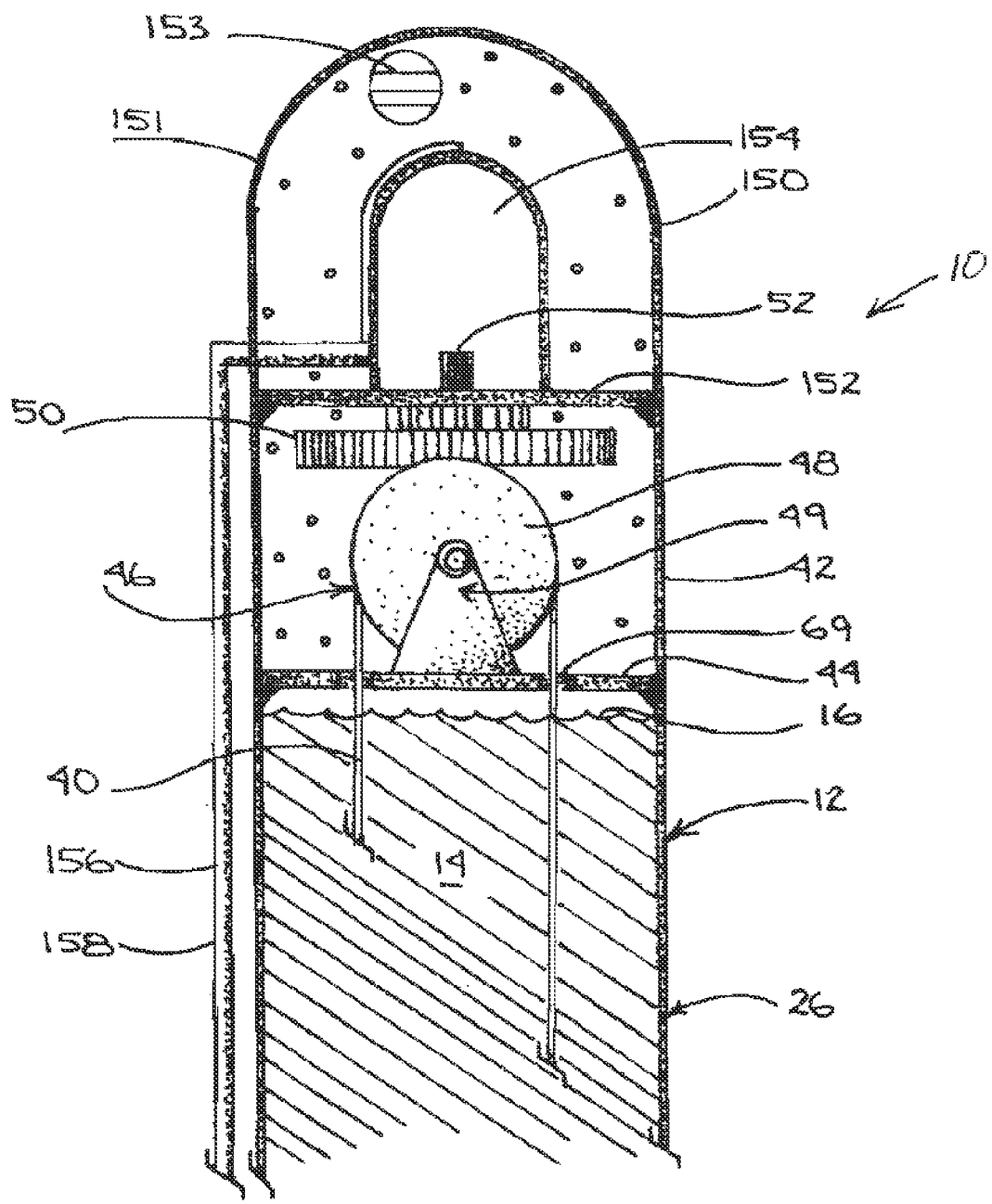
FIG. 7 is an enlarged cross-sectional elevational view of an upper portion of the fluid vessel of the hydro-mechanical power generating system of FIG. 1.

Referring to FIG. 7, the drive system 46 includes one or more rotatable drives 48, which may be rotatably carried or mounted on a support shaft or axle assembly 49. The shaft or axle assembly 49 may be mounted or coupled to the platform 44 or other structure of the drive section 42. The drive 48 may be any rotatable drive, such as a wheel (e.g. pulley wheel), spool, sprocket, etc., that may can be driven by movement of the flexible coupling 40 about the drive 48. The drive 48 may engage and drive one or more gears 50 that power or drive an output drive shaft 52. Alternatively, the drive 48 may directly drive the drive shaft 52 without any interposed gears. As can be seen in FIG. 7, the flexible coupling 40 is passed through openings in the platform 44 and over the rotatable drive 48 so that movement of the flexible coupling 40 about the drive 42 causes it to rotate and thereby power the drive shaft 52 through gears 50. A transmission or other mechanism may be provided so that rotation of the drive 48, with or without the drive gears 50, causes the drive shaft 52 to rotate in only a single direction. The drive gears 50 allow the drive shaft 52 to be driven at the desired r.p.m. and power requirements. In other embodiments, the drive shaft 52 may be rotated in opposite directions corresponding to the direction of rotation of the drive 48 as rotated by the flexible coupling 40.

The flexible coupling 40 may be formed as a continuous loop, with one end of the loop being passed about the rotatable drive 48 and the other end being passed to an idler section 54 of the system 10, as shown in FIG. 3. The idler section 54 is located at a position below the vehicle section 26 and above the gas chamber section 18. A deck or platform 56 may be provided in the fluid vessel 12 for supporting components of the idler section 54. Located above the idler section 54 is a deck or platform 58 for charging of the buoyancy vehicles 28, as is described later on. The deck 58 may define a charging station at the lowermost position of the vehicle section 26.

As can be seen in FIG. 3, the flexible coupling 40 is passed through openings 60 formed in the charging deck 56 with the lower end of the loop of the flexible coupling being passed around an idler 62. The idler 62 may be in the form of a wheel (e.g. pulley wheel), spool, sprocket, etc., and may be mounted to a support shaft or axle assembly 64. The shaft or axle assembly 64 may be mounted or coupled to the platform 56 or other structure of the idler section 54. The idler 62 may be configured similarly or different to the rotatable drive 48. In certain embodiments, the idler 62 may be different than the rotatable drive 48 and the length of flexible coupling 40 that passes about the idler 62 may be different from that that passes around the drive 48. This is because only portions of the length of the coupling 40 pass around each of the rotatable drive 48 and idler 62 as the coupling 40 is moved. Thus, the drive 48 and idler 62 and the portions of the coupling 40 that engage each may be configured differently if desired. For example, the rotatable drive 48 may be configured as a sprocket and the length of the flexible coupling 40 that passes over the drive 48 may be a chain, while the idler 62 may be in the form of a pulley wheel and the length of the flexible coupling 40 that passes over the wheel 62 may be a cable or belt. The idler 62 is configured to freely rotate in both directions as the flexible coupling 40 is passed over the idler 62 as the coupling 40 is moved by the buoyancy vehicles 28 within the vehicle section 26, as is described more later on. In the embodiment shown, the portions of the flexible coupling 40 that engage the drive 48 and idler 62 are formed from lengths of steel cable.

Figure 8:
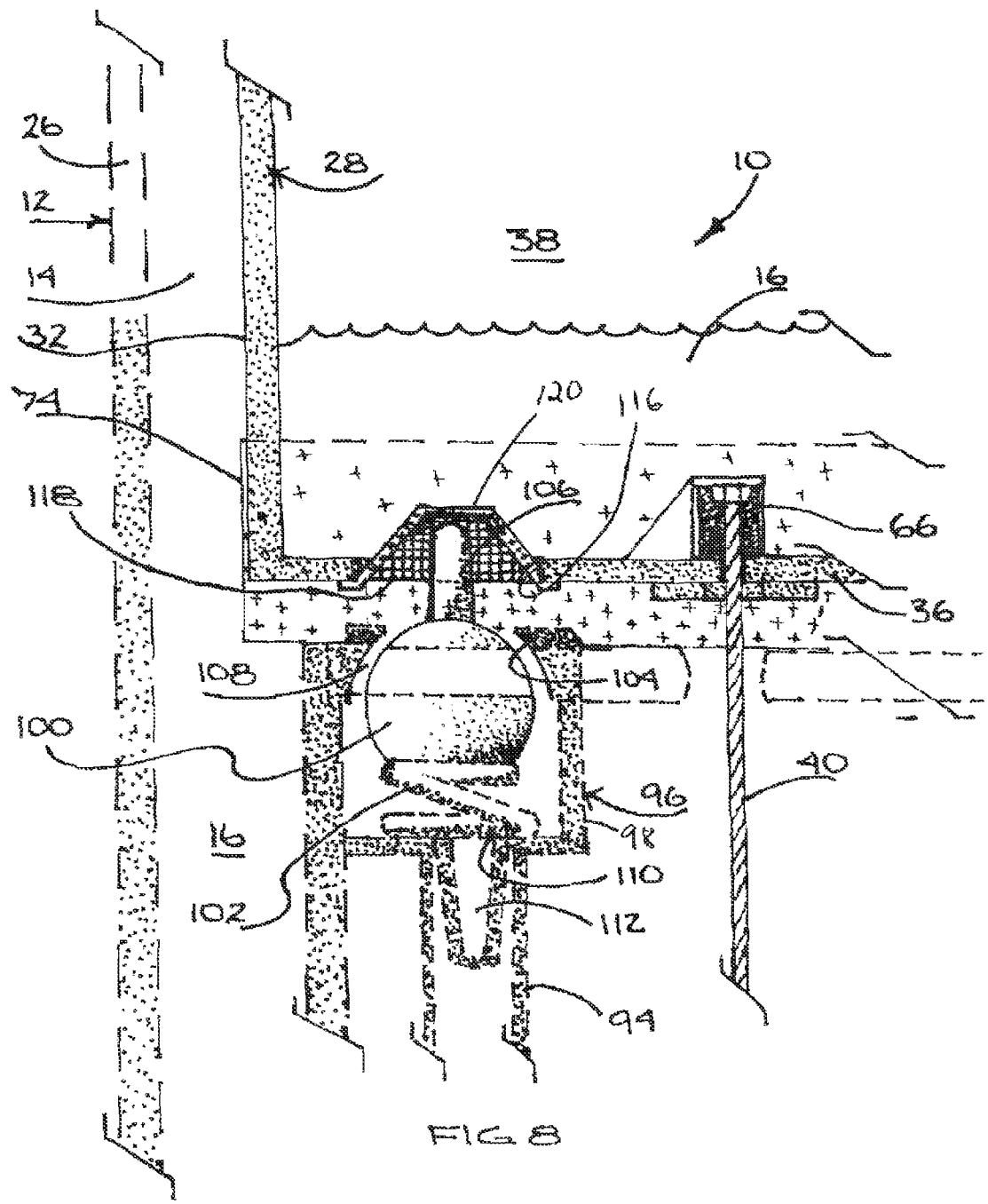
FIG. 8 is an enlarged cross-sectional elevational view of a charging station and lower portion of a buoyancy vehicle of the hydro-mechanical power generating system of FIG. 1, shown as the vehicle is being charged with gas.
Figure 9:
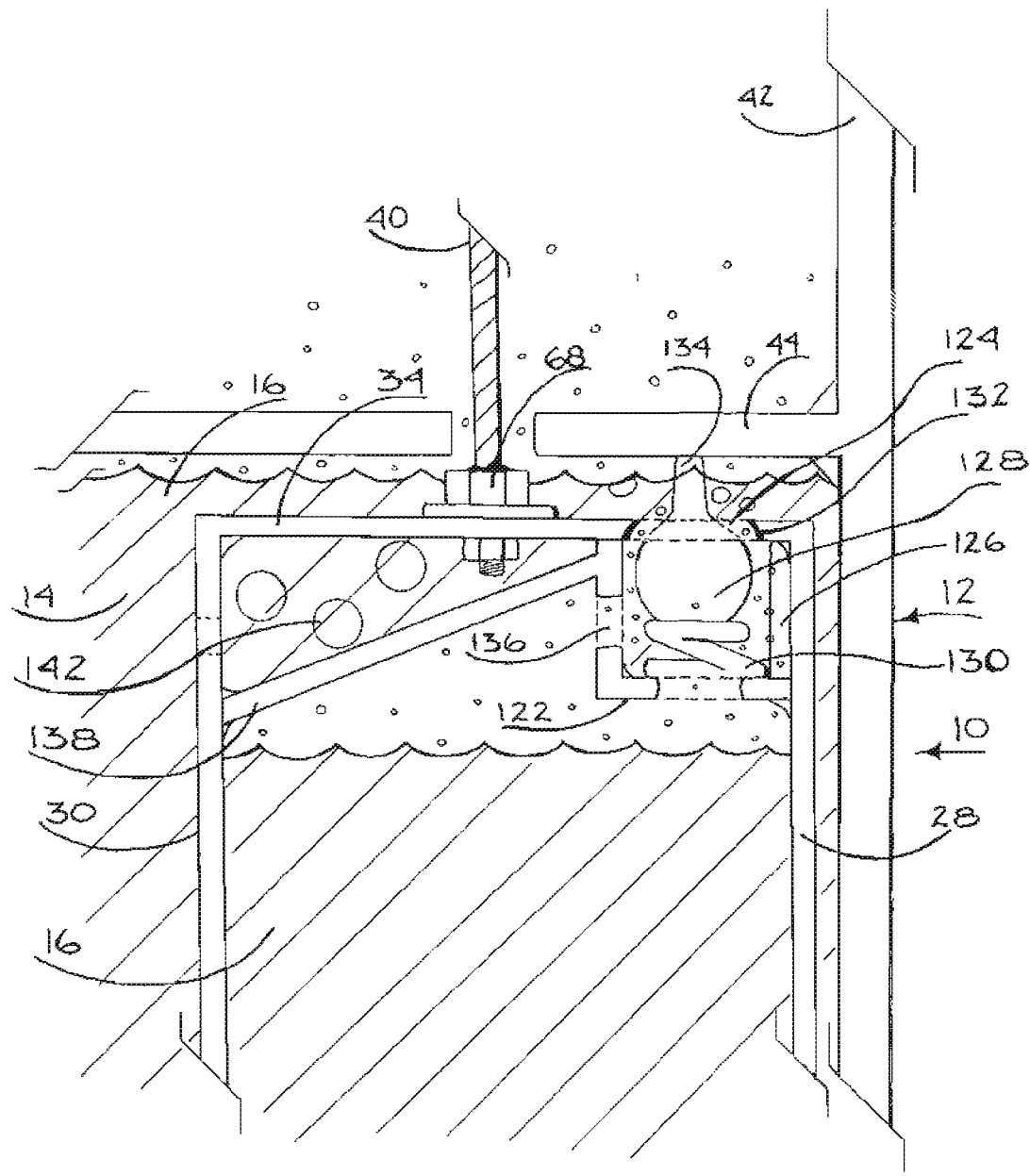
FIG. 9 is an enlarged cross-sectional elevational view of an upper portion of a buoyancy vehicle of the hydro-mechanical power generating system of FIG. 1, showing gas being discharged from the vehicle.

In the embodiment illustrated, the length of the flexible coupling 40 that passes around the idler 62 is coupled at opposite ends to each of the buoyancy vehicles 28A, 28B. As shown in FIGS. 6 and 8, suitable anchoring or coupling structures or devices 66 may be provided for coupling the flexible coupling to the lower wall 36 or lower portion of each of the buoyancy vehicles 28. Similarly, the length of flexible coupling 40 that passes around the rotatable drive 48 is coupled at opposite ends to each of the buoyancy vehicles 28A, 28B. As shown in FIG. 9, suitable anchoring or coupling structures or devices 68 may be provided for coupling the flexible coupling 40 to the upper wall 34 or upper portion of each of the buoyancy vehicles 28. In this way, the buoyancy vehicles 28 themselves form a portion of a continuous length of the flexible coupling 40. As shown, in FIG. 9, the flexible coupling 40 coupled to the upper anchoring structure 68 is passed through an opening 69 formed in the platform 44.

Figure 4:
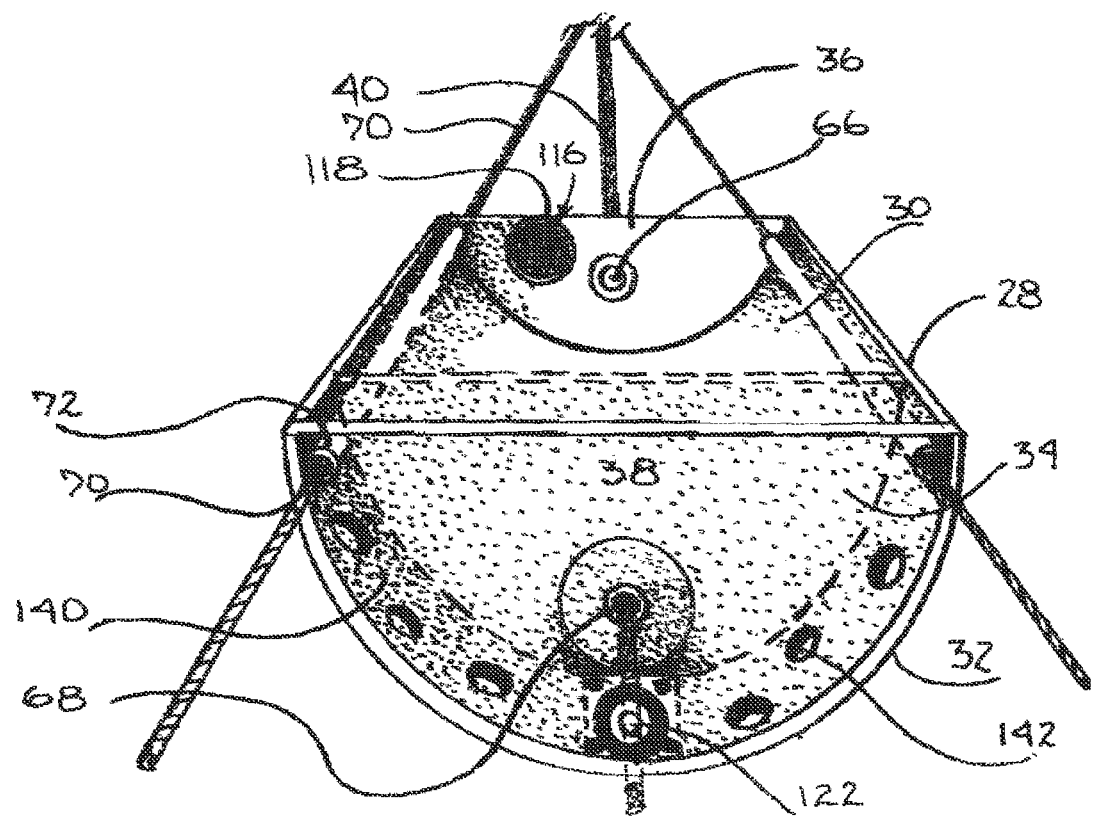
FIG. 4 is a top perspective view of a buoyancy vehicle of the hydro-mechanical power generating system of FIG. 1.
Figure 5:
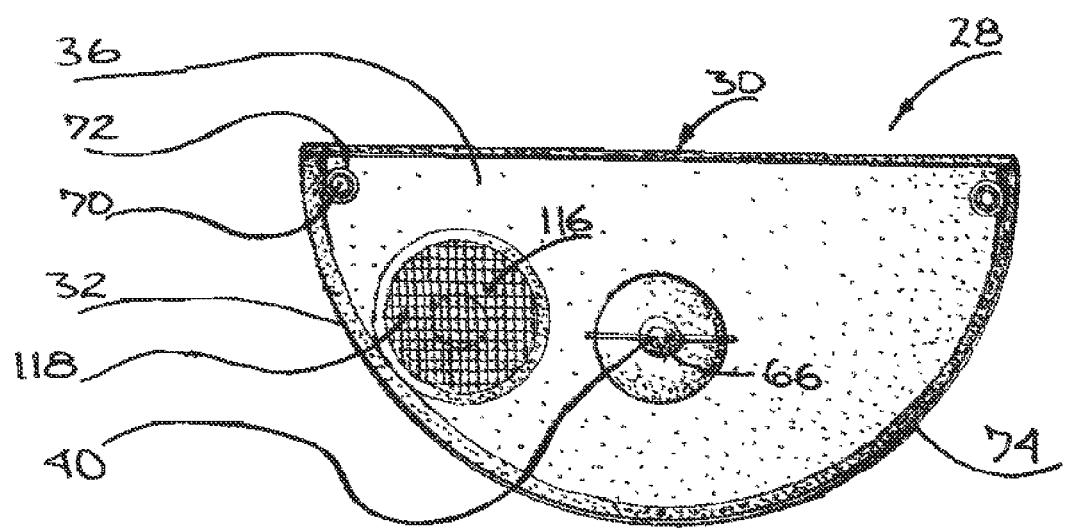
FIG. 5 is a bottom plan view of the buoyancy vehicle of FIG. 4.
Figure 6:
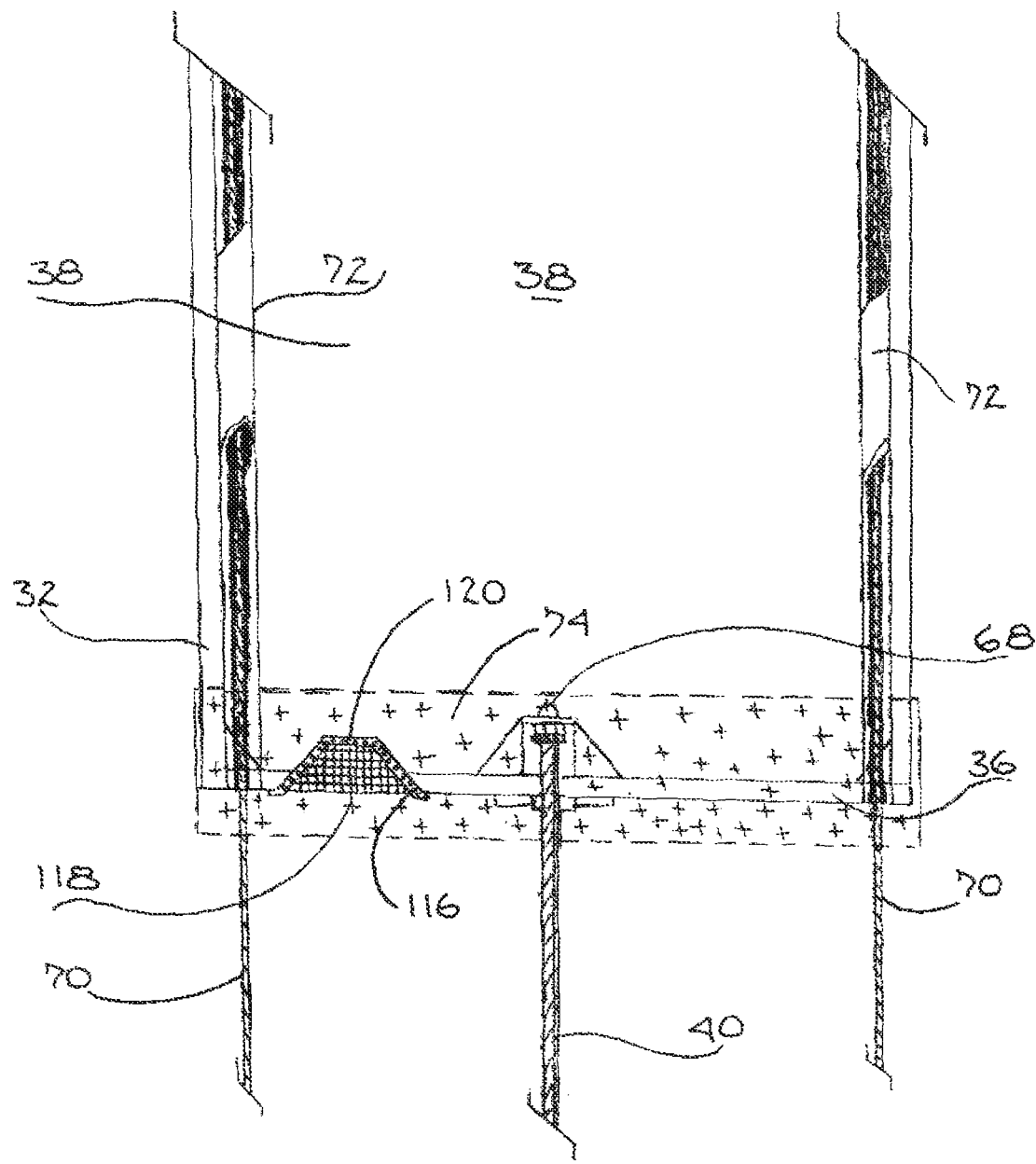
FIG. 6 is a cross-sectional elevational view of a lower portion of the buoyancy vehicle of FIG. 4.

As shown in FIGS. 4-6, buoyancy vehicle guide members 70 may also be provided in the vehicle section 26 of the system 10. The guide members 70 may be elongate members that extend along the length of the vehicle section 26 and may be coupled or mounted at opposite ends to the platform or decks 44 and 58 or other structures of the system 10. The guide members 70 engage the buoyancy vehicles 28 to facilitate free movement of the buoyancy vehicles 28 along a generally linear vertical path while preventing significant lateral or side-to-side movement of the vehicles 28. In the embodiment shown, the guide members 70 are in the form of a pair of cables that are stretched taut and anchored at each end to the platforms 44, 58 through suitable anchoring or coupling structures or mechanisms. The guide members 70 may be flexible elongate members that are placed under tension and anchored at each end so that they are generally straight and rigid. The guide members 70 may also be formed from rigid, elongate members, such rails, rods, etc. The guide members 70 engage guide apertures, brackets, conduits, tubing or other structures that may be provided with the buoyancy vehicles 28. In the embodiment shown, the cables 70 are passed through guide tubes or conduits 72 that extend along the length or portion of the length of each of the buoyancy vehicles 28. The tubing 72 is provided along each side of the buoyancy vehicle 28 and passes from the upper and lower walls 34, 36. The tubing 72 may be isolated from the interior reservoir 38 to prevent fluid flow into or out of the tubing 72 from the reservoir 38. A flexible skirting 74 is provided at the lower end of the vehicle 28. The skirting 74 extends a short distance past the lower wall 36 and surrounds the perimeter of the vehicle 28.

Figure 10:
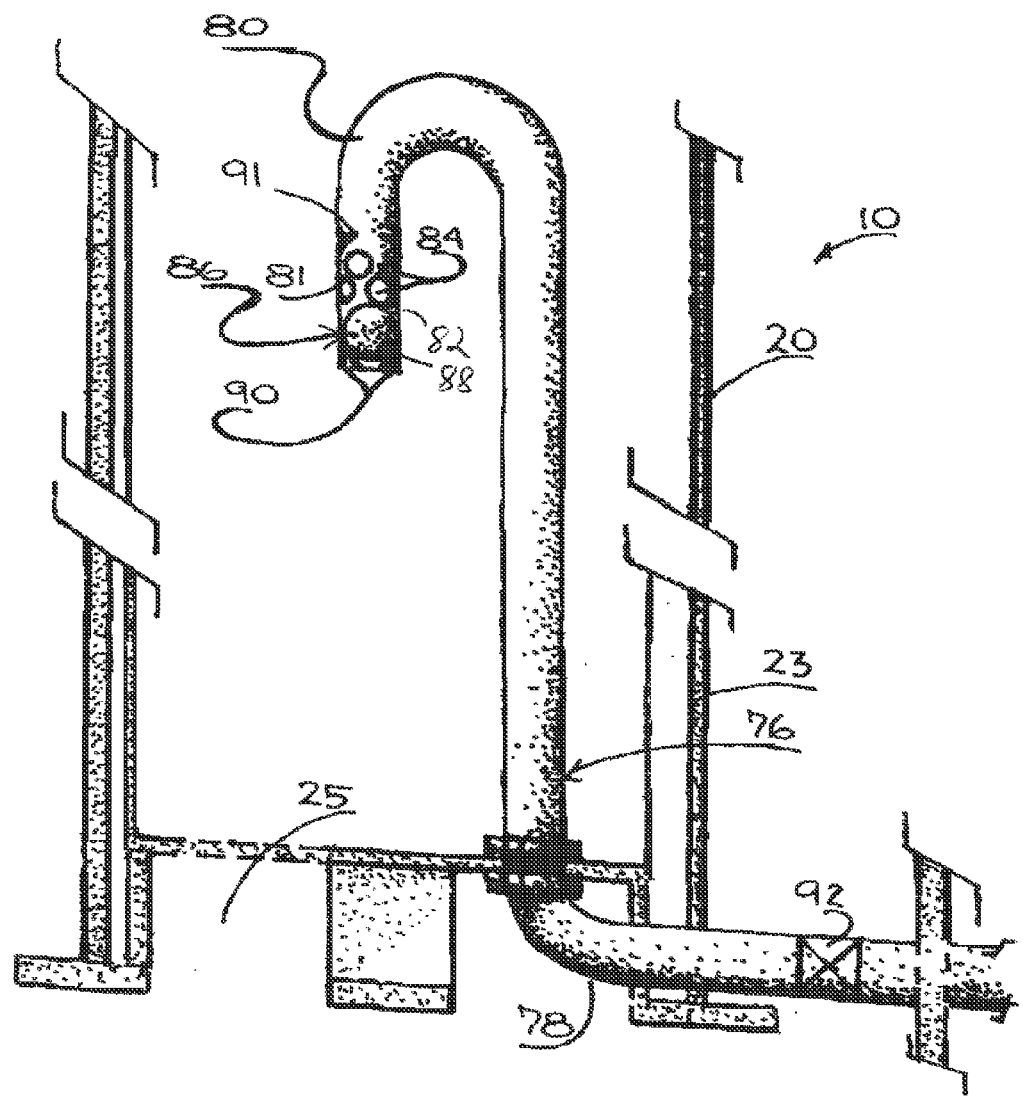
FIG. 10 is an enlarged elevational view of a pressurized gas injection system of the hydro-mechanical power generating system of FIG. 1.

Referring to FIGS. 3 and 10, pressurized gas is introduced into gas chamber 20 through a pressurized gas injection system 76. The injection system 76 is fluidly coupled to a source of pressurized gas, such as air, etc., which may be located exterior to the fluid vessel 12. The injection system 76 includes a conduit 78 that passes through the exterior wall of the vessel 12 and into the interior of the pressurized gas chamber 20. In other embodiments, both the injection system 76 and gas chamber 20 may be located exterior to the fluid vessel 12. As can be seen in FIG. 10, the conduit 78 passes upward from the bottom of gas chamber 20 and is provided with a U-shaped upper portion 80 having a downwardly extending portion 81. The end 81 of the U-shaped portion 80 has a gas discharge 82 formed by one or more openings 84 to allow passage of pressurized gas from the conduit 78 to be discharged into the interior of the gas chamber 20. The discharge 82 is located at a position above the lower end of the gas chamber 20, and may be located at a position in the upper ½ or ⅓ of the gas chamber 20 or above any fluid level of the buoyant fluid 16 that enters the gas chamber 20.

A valve 86 may be provided with the discharge 82 to selectively close the discharge 82 to prevent any buoyant fluid 16 that may rise above the level of the discharge openings 84 from entering the conduit 78. The valve 86 may be provided with a valve member 88, which may be a spherical or ball-shaped valve member that is buoyant in the fluid 16. When the valve 86 is open, the valve member 88 may rest against a stop member or retainer 90 located at the lower end of the U-shaped portion 81, which may be open at the lower end, below the openings 84. A valve seat 91 is provided within the portion 81 and is configured for sealing engagement with the valve member 88. If the fluid level of the buoyant fluid 16 within the gas chamber 20 rises above the level of the openings 84, the valve member 84 will be lifted by the fluid 16 until it seats against the valve seat 91 and effectively seals the conduit 78. A check valve 92 may also be provided with the conduit 78 (FIG. 10) to prevent back flow of the pressurized gas. Other valves (not shown) may be provided for controlling the flow of pressurized gas through the conduit 78, such as during shutdown and startup procedures, etc.

Referring to FIG. 3, pressurized gas from the chamber 20 is passed through conduits 94 to charging valves 96, which are provided at the charging station 58 for each buoyancy vehicle 28. Each conduit 94 is in fluid communication with the interior of the upper dome section 22 of the chamber 20 and passes through openings or spaces in the idler platform 56. The conduit 94 or portions thereof may be a rigid or flexible, such as flexible hose, etc. In certain embodiments where the gas chamber 20 is located exterior to the fluid vessel 12, the conduits 94 may pass from the chamber 20 to the interior of the vessel 12 to the charging valves 96.

Figure 11:
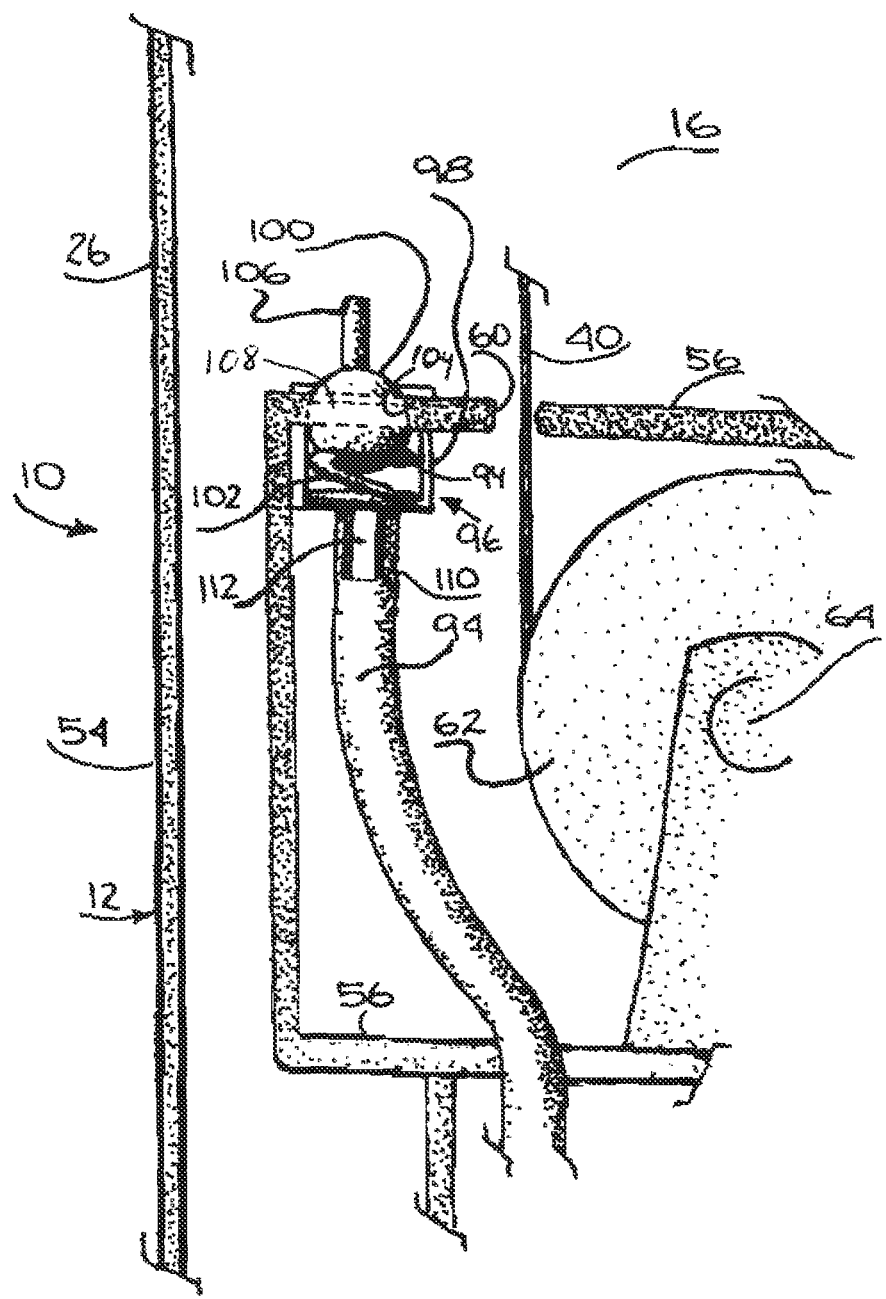
FIG. 11 is an enlarged elevational view of a charging station of the hydro-mechanical power generating system of FIG. 1.

In the embodiment shown in FIG. 11, each charging valve 96 includes a valve body or housing 98 that is coupled to an opening 99 in the charging platform 58. Disposed within the valve housing 98 is a valve member 100, which is shown as being spherical or ball-shaped member, although other configurations may be used as well. A biasing member 102, such as coiled spring, is disposed within the housing 98 and forces the valve member 100 against a valve seat 104 to effectively close the valve 96 to prevent the passage of pressurized gas from conduit 94. As shown in FIG. 11, the valve seat 104, which may be formed at least in part form a rubber or elastomeric material, may have a cooperating concave or hemispherical configuration for receiving the valve member 100. The valve 96 may include an actuating member 106. The end of the actuating member 106 locates at a position above the platform 58 or may be otherwise positioned and/or configured for engagement with the buoyancy vehicle 28, as is described later on. The actuating member 106 is coupled to or otherwise engages the valve member 100 so that depressing the actuating member 106 unseats the valve member 100 from the valve seat 104 to allow pressurized gas to pass through valve outlet 108. In the embodiment shown, the actuating member 106 is formed as a projecting member that is coupled or joined at its lower end to the upper end of the valve member 86. The valve inlet 110 may be provided with a fitting 112 for coupling the conduit 94 to the valve 96. This may include a threaded fitting, a barbed fitting for flexible tubing, etc.

FIG. 8 shows an enlarged view of the charging valve 96 and a lower portion of the buoyancy vehicle 28 as it is lowered to the charging station 58. As can be seen, the buoyancy vehicle 28 includes a lower fluid port 116 formed in the lower wall 36 that is aligned with the valve outlet 108 when the buoyancy vehicle is positioned at the charging station 58. In the embodiment shown, the fluid port 116 is provided with fluid permeable port cover 118. The cover 118 of the buoyancy vehicle 28 may be configured for directly engaging and actuating the actuating member 106 when the buoyancy vehicle 28 is lowered to the charging station 58. In the embodiment shown, the cover 118 is configured as a concave- or frusto-conical-shaped member that is configured to be received within the port 116, with the uppermost end 120 of the cover engaging the actuating member 106. All or a portion of the cover 118 may be formed from a mesh or screen material (e.g. stainless steel wire mesh) that allows the passage of fluid through the port 116 and that is structurally capable of actuating the valve 96 during continued operation of the system 10, as described herein. Other actuating mechanisms may also be used wherein lowering of the buoyancy vehicle 28 to the charging station 58 actuates the valve 96 to release pressurized gas into the fluid port 116.

Referring to FIG. 9, a release valve 122 is provided with each of the buoyancy vehicles 28. The release valve 122 is located at the upper end of the buoyancy vehicle 28 and is associated with an upper fluid port 124 formed in the vehicle 28. In the embodiment shown, the fluid port 124 is formed in the upper wall 34. The release valve 122 may be constructed similarly to the charging valve 96 and may include a valve body or housing 126. The valve housing 126 may be coupled to the upper wall 34 of the vehicle 28. Disposed within the valve housing 126 is a valve member 128, which is shown as being spherical or ball-shaped member, although other configurations may be used. A biasing member 130, such as coiled spring, is disposed within the housing 126 and forces the valve member 128 against a valve seat 132 to effectively close the valve 122 to prevent the escape of gas from the interior reservoir 38. As shown in FIG. 9, the valve seat 132, which may be formed at least in part form a rubber or elastomeric material, may have a cooperating concave or hemi-spherical configuration for receiving the valve member 128. The valve 122 may include a release valve actuating member 134. The upper end of the actuating member 134 locates at a position above the upper wall 34 or is otherwise positioned and/or configured for engagement with a release valve engagement member or other structure located at the upper end of the vehicle section 26, as is described later on. In this case, the release valve engagement member constitutes a portion of the drive platform 44, although other structures configured for engagement with the actuating member 134 may be provided for engagement with the actuating member 134 when the buoyancy vehicle 28 is located in the uppermost position within the vehicle section 26. The actuating member 134 is coupled to or otherwise engages the valve member 128 so that depressing or actuating the actuating member 134 unseats the valve member 128 from the valve seat 132 to allow gas within the interior 38 of the vehicle 28 to be released through outlet 124. The released gas is exhausted to the upper portion of the vessel 12. In the embodiment shown, the actuating member 134 is formed as a projecting member that is coupled or joined at its lower end to the upper end of the valve member 128.

A valve inlet 136 is provided in the housing 126 and is located at a position within the uppermost level of the interior 38 of the vehicle 28. In the embodiment shown, the inlet 136 is provided in a sidewall of the housing 126. Within the interior of the vehicle 28, a sloped wall or baffle 138 may be provided to facilitate directing pressurized gas to the valve inlet 136 during its release. Located above the baffle 138 and isolated from the upper section of the vehicle interior 38 is a flood section 140 having portals 142 for allowing fluid from the vehicle section 26 to flow into the section 140.

Figure 12:
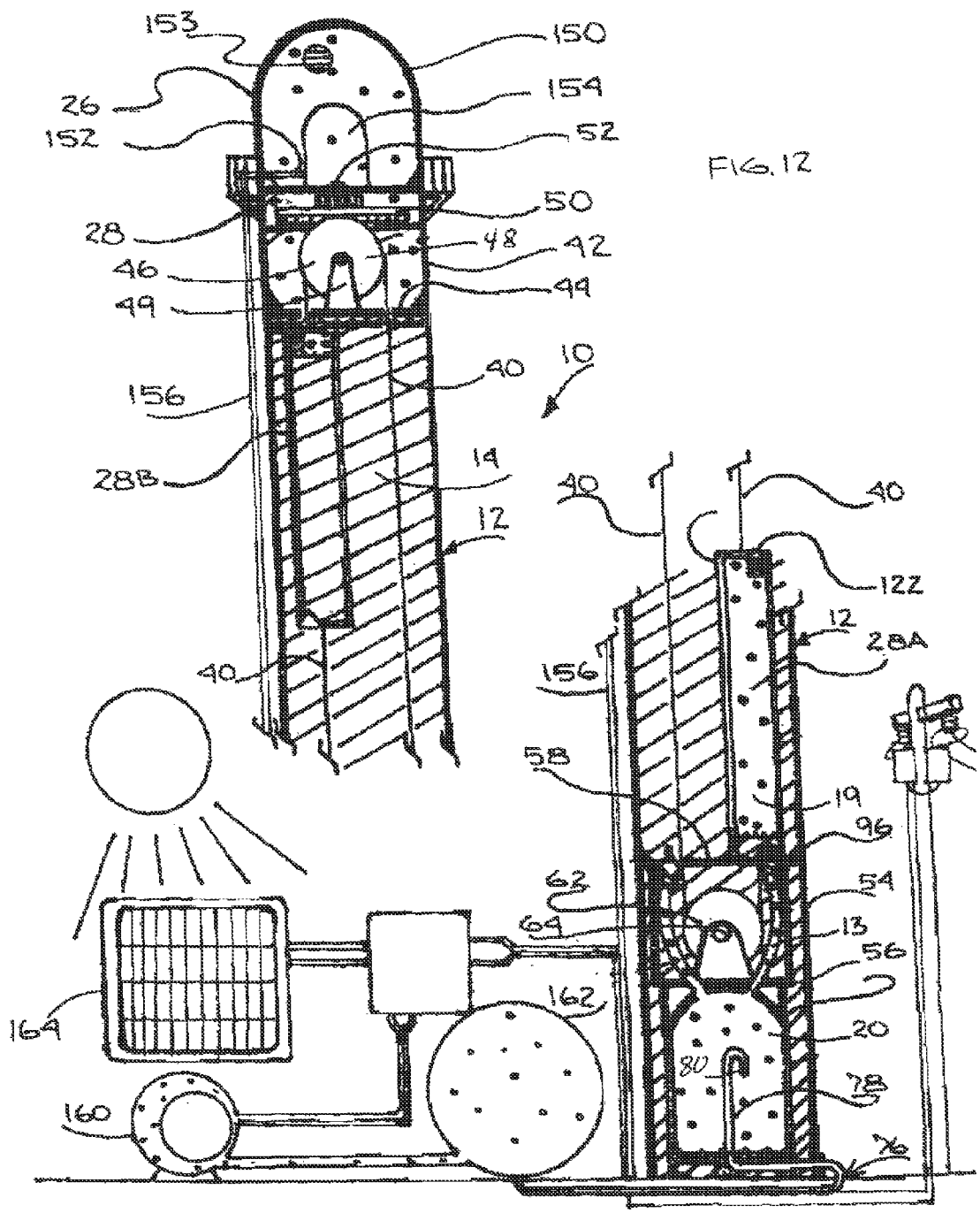
FIG. 12 is another cross-sectional elevational view of the hydro-mechanical power generating system of FIG. 1.

Referring to FIGS. 7 and 12, a generator section 150 may be provided in uppermost portion the vessel 12, which may be capped by a dome or hemi-spherical shaped vessel endcap 151. The generator section 150 is located at a position above the drive section 42 and may be provided with a generator platform or deck 152. A gas vent 153 may also be provided in this section 150 or other upper section of the tower 12 for venting released gas from within tower 12 from the system 10. In other embodiments, the released gas may be collected and/or recycled for reuse in the system 10.

The generator section 150 may house an electrical generator 154 that is supported by the platform 152 and is coupled to and powered by the rotatable drive shaft 52 of the drive 48, either directly or through any provided transmission or gears. The generator 154 generates electricity that may be transmitted to power lines 156. All or a portion of the generated electricity from the generator 154 may be transmitted via power lines 158 to a power grid system or network where it may be eventually transmitted to end users. The electrical power may be transmitted to other electrical power devices, such as batteries or other systems where electrical power can be stored or otherwise utilized.

All or a portion of the electrical power generated by the power system generator 154 may be transmitted to components of the system 10. As shown in FIGS. 1 and 12, the power from generator may be transmitted via power line 158 to a gas compressor 160, which may be an air compressor, through any required electrical inverters 162 or other equipment. The compressor 160 is used to provide compressed air or gas to the system 10. The compressor 160 may provide compressed gas or air to an exteriorly located pressurized gas storage vessel 162. The storage vessel 162 may constitute the pressurized gas source that is supplied to the system through the conduit 78, as previously discussed.

The compressor 160 may also be powered by other power sources. These may include renewable energy sources, such as solar power, wind, water currents, etc. In the embodiment shown, solar panel(s) 164 are provided as a power source for the compressor 160. The energy source may also be a geologically stored or provided energy, such as geo-thermal energy, geo-pneumatic energy, hydro-geological energy, etc. Such energy sources may be used to generate electricity for the compressor or may be used directly in the system. For example, natural gas or other geological gases that are stored underground under high pressures, when brought to the surface, may be used to operate a turbine or generator to generate electricity that is provided to the system 10. Alternatively, the geological gases (e.g. natural gas) may be used in the system 10 itself instead of air and provided as the pressurized gas that operates the system 10, as is described herein.

Figure 13:
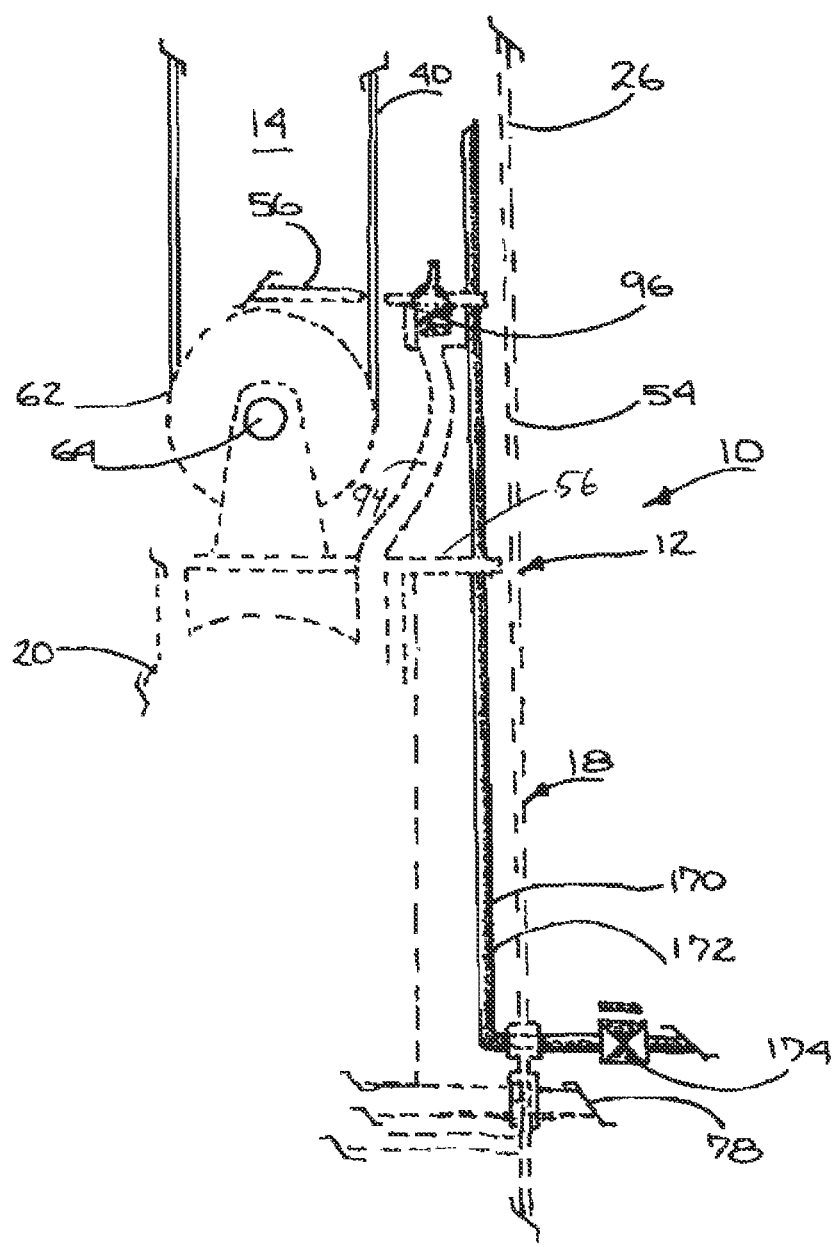
FIG. 13 is an elevational view of a preloading system employed with the hydro-mechanical power generating system of FIG. 1.

Referring to FIG. 13, a preloading system 170 is shown. The preloading system 170 may be used to initiate operation or startup of the system 10. The preloading system 170 provides pressurized gas separately from that provided by the pressurized gas chamber 20. The preloading system 170 includes one or more conduits 172 that are fluidly coupled to an external pressurized gas source, which may be the same or different than that provided from vessel 162. The conduit 172 may be passed to the interior of the fluid vessel 12 adjacent the conduit 78 and up through the platforms 56 and 58. The conduit 172 has an outlet that may be aligned or associated with the fluid port 116 of at least one of the buoyancy vehicles 28 or a separate fluid port (not shown) provided with the vehicle(s) 28 for this purpose. Alternatively, the outlet of the conduit 172 may be located under the flexible skirting 74, wherein gas is trapped under the skirting 74 and is directed through fluid port 160. One or more control valves 174 are used to selectively control the input of pressurized gas to the buoyancy vehicles 28 during startup.

Referring to FIGS. 2 and 12, in operation, the buoyancy vehicles 28A, 28B may be initially located at opposite ends of the vehicle section 26 at or near the upper or lowermost positions within the vehicle section 26. The operation will be described with the buoyancy vehicle 28A (right) initially being in the lowermost position and the buoyancy vehicle 28B (left) being in the uppermost position of the vehicle section 26. A releasable braking or locking system (not shown) may be provided for locking or keeping the buoyancy vehicles 28 in place within the vehicle section 26 when the system 10 is not in use. Initially, the vehicles 28A, 28B may be located just far enough away from either end so that the actuating members 106, 134 of the valves 96, 122, respectively, are not engaged and the valves 96, 122 remain closed. The upper buoyancy vehicle 28B may initially have any existing gas discharged through fluid port 124 so that the interior 38 of the vehicle will be substantially filled with the fluid 16. The vehicle 28B located at the upper end of the vehicle section 26, filled with fluid 16 after discharge of the gas so that it is no longer buoyant, will act with downward force on the flexible coupling 40 due to gravity.

With any breaking or locking mechanism disengaged or released, pressurized air or other gas used with the system 10 may be initially introduced into the lowermost vehicle 28A through the preloading system 170 by actuating the valve 174. Initially, the vehicle 28A located at the lower position will be filled with the buoyancy fluid 16. As air or gas is introduced into the interior reservoir 38 of the vehicle 28A, fluid 16 within the vehicle interior 38 will be displaced and pass out through fluid port 116 or other port provided for this purpose and fill the upper portion of the vehicle 28A. As the volume of fluid is displaced, the buoyancy of the fluid 16 acting on the buoyancy vehicle 28A located at the lower position will be sufficient to overcome those gravitational and frictional forces acting on it that otherwise prevent it from upward movement. The weight of the upper vehicle 28B, which is filled with the fluid 16, also facilitates reducing the amount buoyant force necessary to raise the vehicle 28A due to the balancing effect caused by the weight of the non-buoyant vehicle 28B. As the vehicle 28A is filled with air or gas, both the vehicles 28A and 28B will begin to move, causing the flexible coupling 40 to drive the rotatable drive 48, which in turn begins to drive and power the generator 154 through drive shaft 52. After the vehicles begin to move, the preloading system 170 may be shut off.

As the vehicle 28A rises within the vehicle section 26, the pressurized air or gas within the interior 38 will gradually expand do to the reduced static pressure of the fluid column within the vehicle section 26 as it rises. The expanded air or gas will displace the fluid 16 within the interior 38 through lower port 116 or other ports provided for this purpose. The buoyancy vehicles 28 and the amount of air or gas initially introduced within the interior 38 of the vehicles 28 should be configured to facilitate raising of the vehicle and to prevent the expanded air or gas from completing displacing the buoyant fluid 16 from the interior 38 when the buoyancy vehicle 28 reaches the uppermost position within the vehicle section 26.

When the vehicle 28A reaches the upper end of the vehicle section 26, the actuating member 134 (FIG. 9) of the valve 122 will contact the lower surface of the drive platform 44 or other structure to actuate and open the valve 122 so that the air or gas is released through discharge port 124. The released gas will be discharged to the upper portion of the vessel 12, where it may be eventually be exhausted through vent 153. As the gas is discharged from vehicle 28A, the vehicle 28A will fill with the buoyant fluid 16, through port 116 or other ports provided for this purpose.

Referring to FIG. 8, simultaneously or substantially simultaneously with the vehicle 28A reaching the uppermost position, the vehicle 28B locates at the lowermost position of the vehicle section 26. As the vehicle 28B lowers, the port cover 118 engages the actuating member 106 of the charging valve 96 to open the valve 96. Pressurized air or gas from gas chamber 20 is discharged through the conduit 94 associated with vehicle 28B and through valve outlet 108. The pressurized air or gas released flows through fluid port 116 and into the interior 38 of vehicle 28B, thus displacing the buoyancy fluid 16. The flexible skirting 74 also facilitates trapping of any released gas so that it is eventually directed to the port 116. When a sufficient amount of the buoyancy fluid is displaced, the vehicle 28B will begin to rise within the vehicle section 26 causing the flexible coupling 40 to drive the rotatable drive 48 in the opposite direction. A transmission or other system may be provided to facilitate rotating of the drive shaft 52 in a single direction even though the flexible coupling 40 causes the drive 48 to rotate in opposite directions due to the raising and lowering of the vehicles 28A, 28B.

When the vehicle 28B filled with air or gas from the gas chamber 20 reaches the uppermost end of the vehicle section 26, the air or gas is discharged through valve 122, as was described previously with respect to vehicle 28A. Likewise, vehicle 28A will be located at the lowermost position within the vehicle section 26 and will be charged with air or gas at the charging station 58 through the other conduit 94, as was described for vehicle 28B. This will cause vehicle 28A to rise within the vehicle section 26. The process is repeated with each vehicle 28A, 28B being alternately filled or charged with air or gas, which is then discharged, while the other vehicle is alternately being simultaneously charged. Provided that the chamber 20 is continuously provided with sufficient pressurized air or gas from the injection system 76 to fill the buoyancy vehicles 28, as described, the system 10 will generate power and/or electricity that can be used by or transmitted to various end users.

As discussed previously, various systems may be used to supply the pressurized gas. This may be from the compressor 160 that is powered or operated from renewable energy sources, such as through solar panel(s) 164, wind or water currents. In certain embodiments, the pressurized gas may be provided from geologically stored or provided energy, such as geo-thermal energy, geo-pneumatic energy, hydro-geological energy, etc. Such energy sources may be used to generate electricity or power provided to the compressor 160 or may be used directly in the system. Thus, natural gas or other geological gases that are stored underground under high pressures, when brought to the surface, may be used to operate a turbine or generator to generate electricity that is provided to the system 10. Alternatively, the geological gases (e.g. natural gas) may be used in the system 10 itself and provided to the chamber 20 as the pressurized gas. Such system employing geological gases may include any pressure regulating devices to provide the desired amount and selected pressure of gas. Furthermore, a portion or all of the power or generated through the drive 48 may be used to power the compressor 160. In certain embodiments, the discharged gas, such as that exhausted through vent 153 may be recycled or collected and reintroduced into the chamber 20 for compression efficiency on the air compressor 160.

Figure 14:
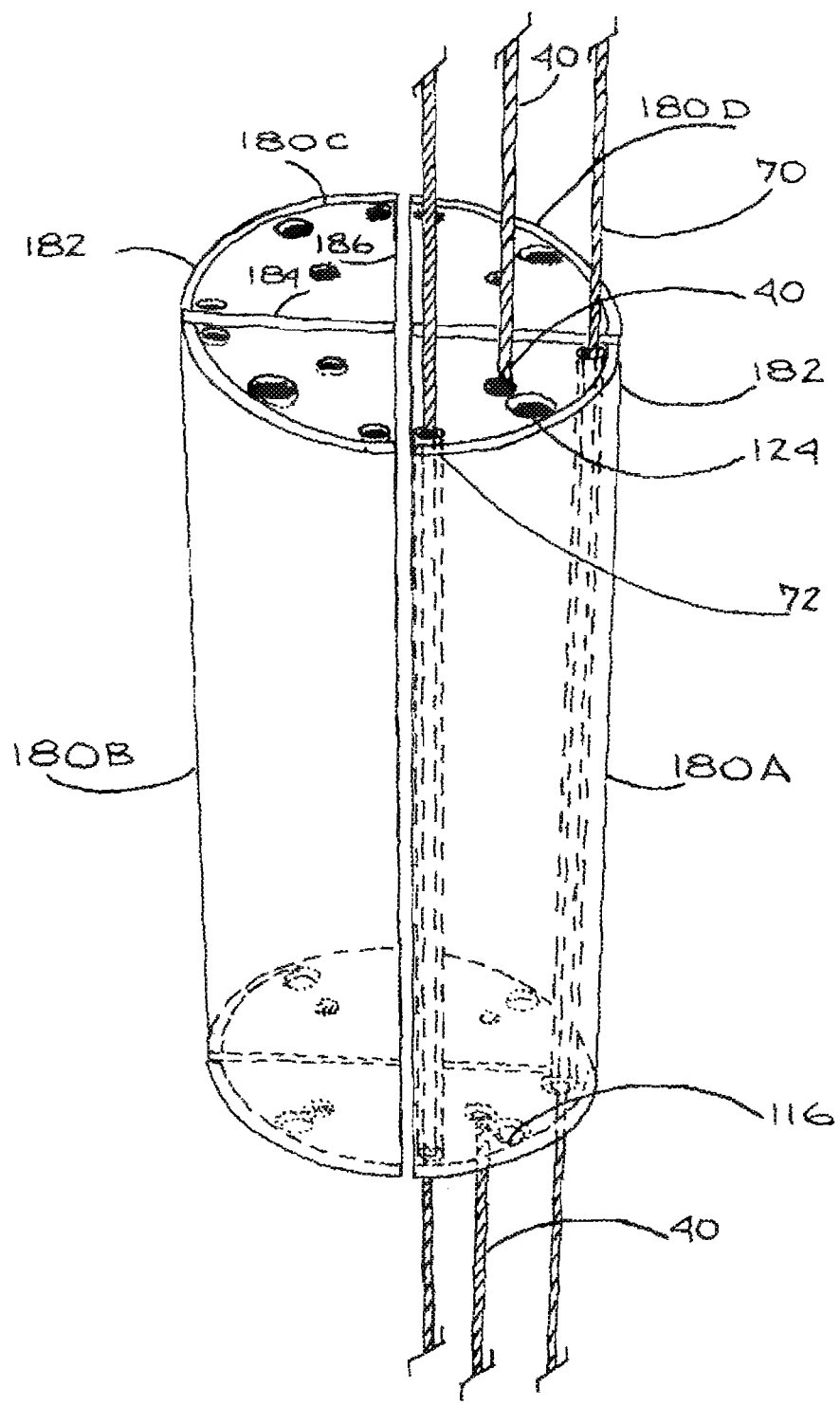
FIG. 14 is perspective view of buoyancy vehicles used in an alternate configuration of a hydro-mechanical power generating system similar to that of FIG. 1.

Referring to FIGS. 14-17, a variation of the system 10 is shown that employs four buoyancy vehicles designated generally with the reference numeral 180. FIG. 14 shows the relative size and configuration of each of the four vehicles as they would be positioned at different times within a section of the vehicle section 26. Each vehicle of FIG. 14 is designated individually with the reference numerals 180A, 180B, 180C and 180D. The buoyancy vehicles 180 each have a substantially circle quadrant transverse cross section, with the outer wall 182 being configured as the outer 90° arc of the circle that is joined by two converging inner walls 184, 186. In the embodiment of FIGS. 14-17, the components of the system may be the same or similar to that of FIGS. 1-13 with similar components designated with the same reference numeral unless otherwise designated.

Figure 17:
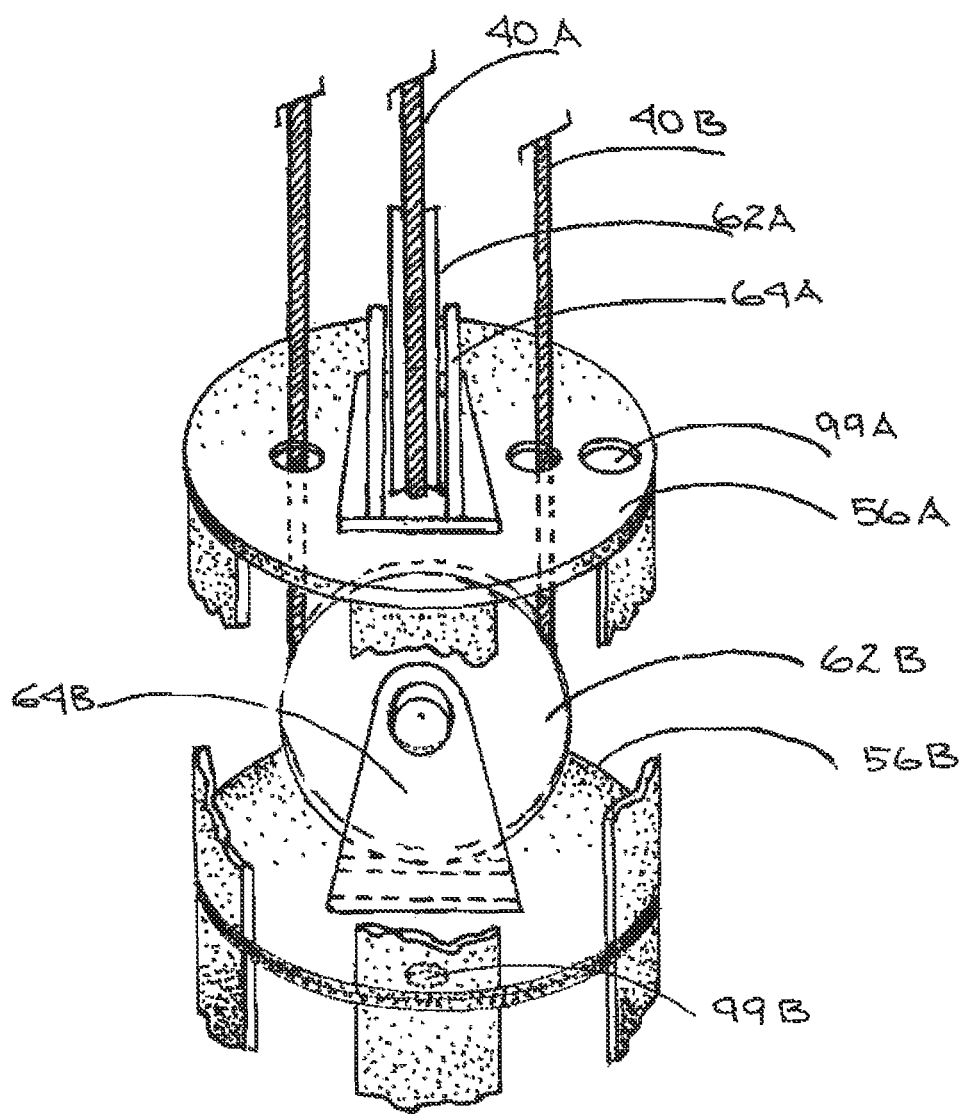
FIG. 17 is perspective view of an idler system for use with the system of FIG. 14.

In the embodiment shown, vehicles 180A and 180C form a cooperating pair of vehicles and vehicles 180B and 180D form a cooperating pair of vehicles, with each pair being coupled to a separate flexible coupling 40A, 40B (FIG. 17). As shown in FIG. 17, separate idlers 62A, 62B are each provided for the flexible couplings 40A, 40B. The idlers 62A, 62B may be oriented at 90° to one another, as shown. Separate idler platforms or decks 56A, 56B that are vertically spaced apart within the vessel 12 may also be provided to support the idlers 62A, 62B and components thereof. In other embodiments, vehicles 180A and 180B may form a cooperating pair and vehicles 180C and 180D may form a cooperating pair. In such instance, the idlers 62 for each pair may be oriented parallel to one another and from the same idler platform or deck 56.

Separate rotatable drives 48 may also be provided for each of the flexible couplings 40A, 40B, and may be provided on separate vertically spaced decks or platforms, similar to the decks 56A, 56B. The separate rotatable drives may be coupled to a single drive shaft 52 through a gear or transmission system that powers generator 150.

As can be seen, any number of pairs of buoyancy vehicles may be employed with the system 10 with the buoyancy vehicles each have a substantially circular-sector-shaped transverse cross section to facilitate disposal and movement within the cylindrical vessel 12.

The operation of the embodiment of FIGS. 14-17 is similar to that previously described employing the buoyancy vehicles 28A, 28B. Additional components necessary for the additional buoyancy vehicles 180 are provided to provide the necessary operation and function, while the general operation and function remains the same.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

I claim:

1. A hydro-mechanical system for generating power comprising:
   an upright elongated fluid vessel containing a fluid:
   a rotatable drive having a drive shaft mounted to the fluid vessel for providing a power output through the drive shaft;
   a pair of buoyancy vehicles that are located within a vehicle section of the vessel and are each coupled by a flexible coupling to the rotatable drive, each buoyancy vehicle defining an interior reservoir for receiving fluids and having upper and lower fluid ports located proximate to the upper and lower ends, respectively, of the buoyancy fluids for allowing the ingress and egress of fluids from the interior reservoir, the buoyancy vehicles each being movable within the vehicle section of the elongated vessel between a lowermost position of the vehicle section and an uppermost position of the vehicle section of the vessel, and wherein each of the pair of vehicles occupies one of the lowermost and uppermost positions when the other of the pair of vehicles occupies the other of the lowermost and uppermost positions, the movement of the buoyancy vehicles within the vehicle section driving the rotatable drive through the flexible coupling to provide the power output;
   a pressurized gas chamber for supplying pressurized gas to a charging station that is located at a position below the vehicle section of the fluid vessel and being in fluid communication with the fluid vessel at a lower end of the gas chamber;
   a pressurized gas source coupled to the pressurized gas chamber through a conduit having a one-way valve for introducing pressurized gas into the gas chamber, the one-way valve preventing gas from the pressurized gas chamber from flowing through the conduit towards the pressurized gas source after being introduced into the pressurized gas chamber;
   a pair of gas charging valves that are each fluidly coupled to the pressurized gas chamber and wherein each charging valve directly engages the lower end of one of the buoyancy vehicles to actuate the charging valve so that the charging valve is open for discharging pressurized gas from the pressurized gas chamber through the lower fluid port when the buoyancy vehicle is located at the lowermost position so that pressurized gas is introduced into the interior reservoir of the buoyancy vehicle through the lower fluid port, the gas charging valve closing when disengaged from the lower end of said one of the buoyancy vehicles; and
   a pair of release valves, each release valve being associated with one of the upper fluid ports, the release valve being actuated upon engagement with a release valve engagement member located at the upper end of the vehicle section so that the release valve is opened to facilitate discharging gas within the interior reservoir of the buoyancy vehicle through the upper fluid port when the buoyancy vehicle is located at the uppermost position, the release valve closing when buoyancy vehicle is lowered from the uppermost position.

2. The system of claim 1, further comprising:
   an electrical generator coupled and powered by the drive shaft of the rotatable drive.

3. The system of claim 1, wherein:
   the interior of the vehicle section of the fluid vessel has a substantially circular cross transverse cross section; and wherein
   the buoyancy vehicles have a substantially circular-sector-shaped transverse cross section.

4. The system of claim 1, wherein:
   the interior of the vehicle section of the fluid vessel has a substantially circular cross transverse cross section; and wherein
   the buoyancy vehicles each have a substantially semi-circular transverse cross section.

5. The system of claim 1, wherein:
   there are two pairs of buoyancy vehicles, each pair being coupled by a separate elongated flexible coupling to the rotatable drive.

6. The system of claim 5, wherein:
   the interior of the vehicle section of the fluid vessel has a substantially circular cross transverse cross section; and wherein the buoyancy vehicles each have a substantially circle quadrant transverse cross section.

7. The system of claim 1, wherein:
at least one of the charging valve and release valve includes a ball-shaped valve member that is biased against a valve seat of said at least one of the charging valve and release valve, the valve member having a projecting portion that engages at least one of the lower end the buoyancy vehicles and the release valve engagement member.

8. The system of claim 1, wherein:
the rotatable drive is located at a position above the vehicle section of the fluid vessel.

9. The system of claim 1, further comprising:
an idler located at a position below the vehicle section of the fluid vessel, the flexible coupling passing about the idler.

10. The system of claim 1,
the conduit has downwardly oriented discharge portion through which the pressurized gas is discharged into the pressure chamber, and wherein the one-way valve includes a floating valve member located within the discharge portion that seats against a floating valve seat located within discharge portion to prevent gas from flowing through the conduit towards the pressurized gas source after being introduced into the pressurized gas chamber.

11. The system of claim 1, wherein:
the pressurized gas source is provided from a renewable energy source.

12. The system of claim 1, wherein:
the pressurized gas source is provided from geologically stored energy.

13. The system of claim 1, wherein:
the pressurized gas source is provided from a geological gas.

14. The system of claim 1, wherein:
the pressurized gas source is air and the fluid is water.

15. The system of claim 1, further comprising:
at least one guide cable that extends between the upper and lower ends of the vehicle section of the fluid vessel to facilitate guiding of the buoyancy vehicles during movement within the vehicle section.

16. The system of claim 15, wherein:
each buoyancy vehicle has a guide tube through which the guide cable passes.

17. The system of claim 1, wherein:
the pressurized gas chamber is located within the fluid vessel.

18. The system of claim 1, further comprising:
a preloading system for providing pressurized gas to at least one buoyancy vehicle separately and apart from the pressurized gas that is provided from the pressurized gas chamber to facilitate startup of the system.

19. A method of generating power comprising:
providing hydro-mechanical system comprising:
  an upright elongated fluid vessel containing a fluid:
  a rotatable drive having a drive shaft mounted to the fluid vessel for providing a power output through the drive shaft;
  a pair of buoyancy vehicles that are located within a vehicle section of the vessel and are each coupled by a flexible coupling to the rotatable drive, each buoyancy vehicle defining an interior reservoir for receiving fluids and having upper and lower fluid ports located proximate to the upper and lower ends, respectively, of the buoyancy fluids for allowing the ingress and egress of fluids from the interior reservoir, the buoyancy vehicles each being movable within the vehicle section of the elongated vessel between a lowermost position of the vehicle section and an uppermost position of the vehicle section of the vessel, and wherein each of the pair of vehicles occupies one of the lowermost and uppermost positions when the other of the pair of vehicles occupies the other of the lowermost and uppermost positions, the movement of the buoyancy vehicles within the vehicle section driving the rotatable drive through the flexible coupling to provide the power output;
  a pressurized gas chamber for supplying pressurized gas to a charging station that is located at a position below the vehicle section of the fluid vessel and being in fluid communication with the fluid vessel at a lower end of the gas chamber;
  a pressurized gas source coupled to the pressurized gas chamber through a conduit having a one-way valve for introducing pressurized gas into the gas chamber, the one-way valve preventing gas from the pressurized gas chamber from flowing through the conduit towards the pressurized gas source after being introduced into the pressurized gas chamber;
  a pair of gas charging valves that are each fluidly coupled to the pressurized gas chamber and wherein each charging valve directly engages the lower end of one of the buoyancy vehicles to actuate the charging valve so that the charging valve is open for discharging pressurized gas from the pressurized gas chamber through the lower fluid port when the buoyancy vehicle is located at the lowermost position so that pressurized gas is introduced into the interior reservoir of the buoyancy vehicle through the lower fluid port, the gas charging valve closing when disengaged from the lower end of said one of the buoyancy vehicles; and
  a pair of release valves, each release valve being associated with one of the upper fluid ports, the release valve being actuated upon engagement with a release valve engagement member located at the upper end of the vehicle section so that the release valve is opened to facilitate discharging gas within the interior reservoir of the buoyancy vehicle through the upper fluid port when the buoyancy vehicle is located at the uppermost position, the release valve closing when buoyancy vehicle is lowered from the uppermost position; and
operating the hydro-mechanical system to rotate the drive shaft and provide power output through the drive shaft through the rotatable drive by alternately charging the buoyancy vehicles with the pressurized gas through the charging valve when the buoyancy vehicles are each located in the lowermost position and discharging gas from within the interior reservoir of the buoyancy vehicle through the upper fluid port when the buoyancy vehicles are each located at the uppermost position.

* * * * *